US012777464B2

(12) United States Patent
Freda et al.

(10) Patent No.: US 12,777,464 B2
(45) Date of Patent: Oct. 27, 2026

(54) PAGING ACQUISITION IN MULTIPATH WTRU TO NETWORK RELAYS

(71) Applicant: InterDigital Patent Holdings, Inc., Wilmington, DE (US)

(72) Inventors: Martino M. Freda, Laval (CA); Oumer Teyeb, Montreal (CA); Tuong Duc Hoang, Montreal (CA); Moon-il Lee, Melville, NY (US); Paul Marinier, Brossard (CA)

(73) Assignee: InterDigital Patent Holdings, Inc., Wilmington, DE (US)

(*) Notice: Subject to any disclaimer, the term of this patent is extended or adjusted under 35 U.S.C. 154(b) by 244 days.

(21) Appl. No.: 18/837,344

(22) PCT Filed: Feb. 9, 2023

(86) PCT No.: PCT/US2023/012666
§ 371 (c)(1),
(2) Date: Aug. 9, 2024

(87) PCT Pub. No.: WO2023/154366
PCT Pub. Date: Aug. 17, 2023

(65) Prior Publication Data
US 2025/0039845 A1 Jan. 30, 2025

Related U.S. Application Data

(60) Provisional application No. 63/308,297, filed on Feb. 9, 2022.

(51) Int. Cl.
*H04W 68/02* (2009.01)

(52) U.S. Cl.
CPC .................................. *H04W 68/02* (2013.01)

(58) Field of Classification Search
CPC .. H04W 68/02; H04W 76/28; H04W 52/0209
See application file for complete search history.

(56) References Cited

U.S. PATENT DOCUMENTS 12,414,195 B2 * 9/2025 Vogedes .............. H04W 68/005
2020/0322918 A1 * 10/2020 Shih ...................... H04W 76/11
(Continued)

OTHER PUBLICATIONS

3rd Generation Partnership Project (3GPP), 3GPP TR 36.746 V15. 1.1, "Study on further enhancements to LTE Device to Device (D2D), User Equipment (UE) to network relays for Internet of Things (IoT) and wearables, (Release 15)", Apr. 2018, 55 pages.
(Continued)

*Primary Examiner* — Lester G Kincaid
(74) *Attorney, Agent, or Firm* — Condo Roccia Koptiw LLP

(57) ABSTRACT

Systems, methods, and instrumentalities are disclosed herein for paging acquisition in multipath WTRU to network relays. A first WTRU may receive configuration information indicating information associated with a first monitoring pattern to use if a first condition is satisfied and information associated with a second monitoring pattern to use if a second condition is satisfied. The first condition and the second condition may be associated with a link quality associated with a second WTRU. The first WTRU may receive a first indication from the second WTRU. The first WTRU may determine that the first condition is satisfied. The first WTRU may send an indication of the first monitoring pattern. The first WTRU may monitor a first paging occasion in accordance with the first monitoring pattern. The first WTRU may receive a first paging message for the second WTRU in the first paging occasion. The first WTRU may send an indication of the received first paging message to the second WTRU.

15 Claims, 10 Drawing Sheets

(56) References Cited

U.S. PATENT DOCUMENTS

| | | | | |
|---|---|---|---|---|
| 2023/0064488 | A1* | 3/2023 | Han | H04W 76/28 |
| 2024/0284402 | A1* | 8/2024 | Back | H04W 48/12 |

OTHER PUBLICATIONS

3rd Generation Partnership Project (3GPP), TR 38.836 V17.0.0, "), Technical Specification Group Radio Access Network, Study on NR Sidelink Relay, (Release 17)", Mar. 2021, 26 pages.

3rd Generation Partnership Project (3GPP), R2-2104503, "Summary document of AI 8.7.4.1, 3GPP TSG-RAN WG2 Meeting #113bis Electronic, ZTE, Online", Apr. 12-20, 2021, 16 pages.

3rd Generation Partnership Project (3GPP), RP-193253, "New SID: Study on NR Sidelink Relay, OPPO, 3GPP TSG RAN Meeting #86, Sitges, Spain", Dec. 9-12, 2019, pp. 5 pages.

3rd Generation Partnership Project (3GPP), TS 36.300 V15.14.0, "Technical Specification Group Radio Access Network, Evolved Universal Terrestrial Radio Access (E-UTRA) and Evolved Universal Terrestrial Radio Access Network (E-UTRAN), Overall description Stage 2 (Release 15)", Dec. 2022, 365 pages.

3rd Generation Partnership Project (3GPP), TS 38.300 V16.1.0, "Technical Specification Group Radio Access Network, NR, NR and NG-RAN Overall Description, Stage 2 (Release 16)", Mar. 2022, 133 pages.

3rd Generation Partnership Project (3GPP), TS 38.300 V16.2.0, "Technical Specification Group Radio Access Network, NR, NR and NG-RAN Overall Description, Stage 2 (Release 16)", Jul. 2022, 148 pages.

3rd Generation Partnership Project (3GPP), TS 38.340 V0.4.0, Technical Specification Group Radio Access Network, NR, Backhaul Adaptation Protocol (BAP) specification (Release 16), Mar. 2020, 21 pages.

* cited by examiner

PAGING ACQUISITION IN MULTIPATH WTRU TO NETWORK RELAYS

CROSS REFERENCE TO RELATED APPLICATIONS

This application is the National Stage Entry under 35 U.S.C. § 371 of Patent Cooperation Treaty Application No. PCT/US2023/012666, filed Feb. 9, 2023, which claims the benefit of U.S. Provisional Patent Application No. 63/308, 297, filed Feb. 9, 2022, the contents of which are hereby incorporated by reference herein.

BACKGROUND

Mobile communications using wireless communication continue to evolve. A fifth generation of mobile communication radio access technology (RAT) may be referred to as 5G new radio (NR). A previous (legacy) generation of mobile communication RAT may be, for example, fourth-generation (4G) long-term evolution (LTE). Wireless communication devices may establish communications with other devices and data networks, e.g., via an access network, such as a radio access network (RAN).

SUMMARY

Systems, methods, and instrumentalities are disclosed herein that may be associated with paging acquisition in multipath WTRU to network relays.

A first wireless transmit-receive unit (WTRU) may include a processor, a memory, a transmitter, and a receiver (e.g., where in examples a transceiver may comprise the transmitter and receiver). The first WTRU may be configured to perform one or more of the following via one or more of the processor, the memory, the transmitter, and the receiver.

The first WTRU (e.g., a relay WTRU) may receive, from a network device (e.g., a base station, such as a gNB, etc.), configuration information that indicates information associated with a first monitoring pattern to use if a first condition is satisfied and information associated with a second monitoring pattern to use if a second condition is satisfied. The first condition and the second condition may be associated with a link quality associated with a second WTRU (e.g., a remote WTRU). The link quality may be associated with a link between the second WTRU and the network device. The first WTRU may receive a first indication from the second WTRU, and the first indication may indicate a first value of the link quality. The first WTRU may determine, based on the first value of the link quality, that the first condition is satisfied. The first WTRU may send, based on the first condition being satisfied, an indication of the first monitoring pattern (e.g., to the second WTRU). The first WTRU may monitor, based on the first condition being satisfied, a first paging occasion in accordance with the first monitoring pattern. The first WTRU may receive (e.g., from the network device) a first paging message for the second WTRU in the first paging occasion. The first WTRU may send information indicating the received first paging message to the second WTRU.

The first WTRU may receive a second indication from the second WTRU. The second indication may indicate a second value of the link quality. The first WTRU may determine, based on the second value of the link quality, that the second condition is satisfied. The first WTRU may send, based on the second condition being satisfied, an indication of the second monitoring pattern (e.g., to the second WTRU). The first WTRU may, based at least on the second condition being satisfied, monitor a second paging occasion in accordance with the second monitoring pattern. The first WTRU may receive (e.g., from a base station such as a gNB) a second paging message for the second WTRU in the second paging occasion. The first WTRU may send an indication of the received second paging message to the second WTRU.

The first monitoring pattern may be a first paging occasion pattern, and the first monitoring pattern may be determined based on a reduced discontinuous reception (DRX) cycle of the second WTRU.

Being configured to monitor the first paging occasion in accordance with the first monitoring pattern may be based on the first WTRU being associated with a power saving operation.

The power saving operation may be a connected DRX operation.

The power saving operation may correspond to idle operation or inactive operation.

The first WTRU may determine the first monitoring pattern using the information associated with the first monitoring pattern. The information associated with the first monitoring pattern may be a DRX cycle reduction that is used if the first condition is satisfied, and the DRX cycle reduction may be a reduction of a DRX cycle of the second WTRU.

The first WTRU may determine the first monitoring pattern, which may include one or more of the following. The first WTRU may receive identification information associated with the second WTRU and a DRX cycle of the second WTRU. The first WTRU may compute a paging occasion pattern based on the identification information and the DRX cycle. The first WTRU may determine a subset of paging occasions in the paging occasion pattern to monitor based on the first value of the link quality. The subset of paging occasions may correspond to the first monitoring pattern.

The first WTRU may send to the network device or the second WTRU a missed paging occasion indication. The missed paging occasion indication may indicate a paging occasion of the second WTRU that was missed by the first WTRU. The first WTRU may send to the network device a missed paging occasion indication, and the missed paging occasion indication may indicate a paging occasion that was missed by the second WTRU.

DETAILED DESCRIPTION

Figure 1A:
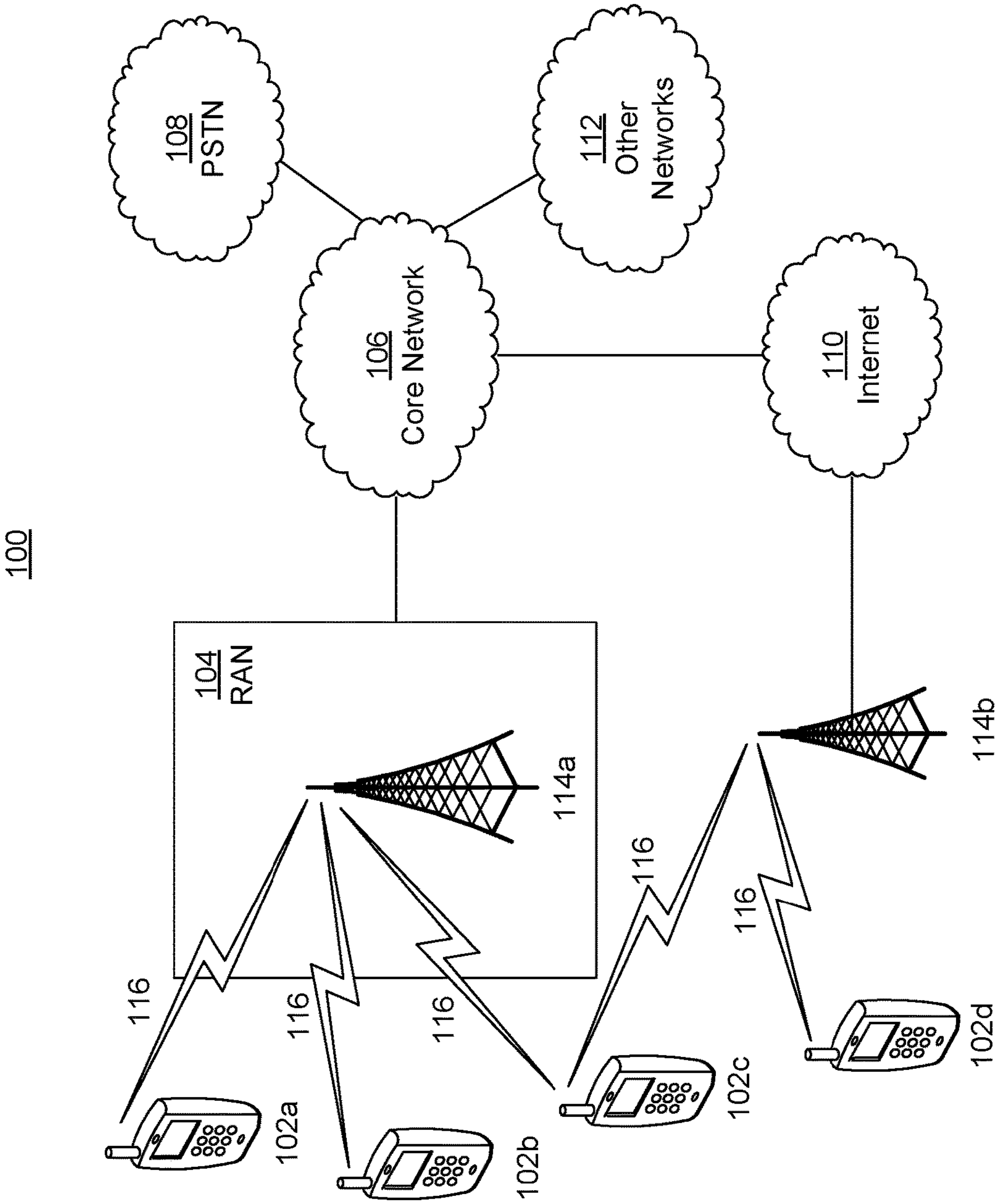
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106/115, the Internet 110, and/or the other networks 112. By way of example, the base stations 114*a*, 114*b* may be a base transceiver station (BTS), a Node-B, an encode B, a Home Node B, a Home eNode B, a gNB, a NR NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR, etc.) to establish a picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
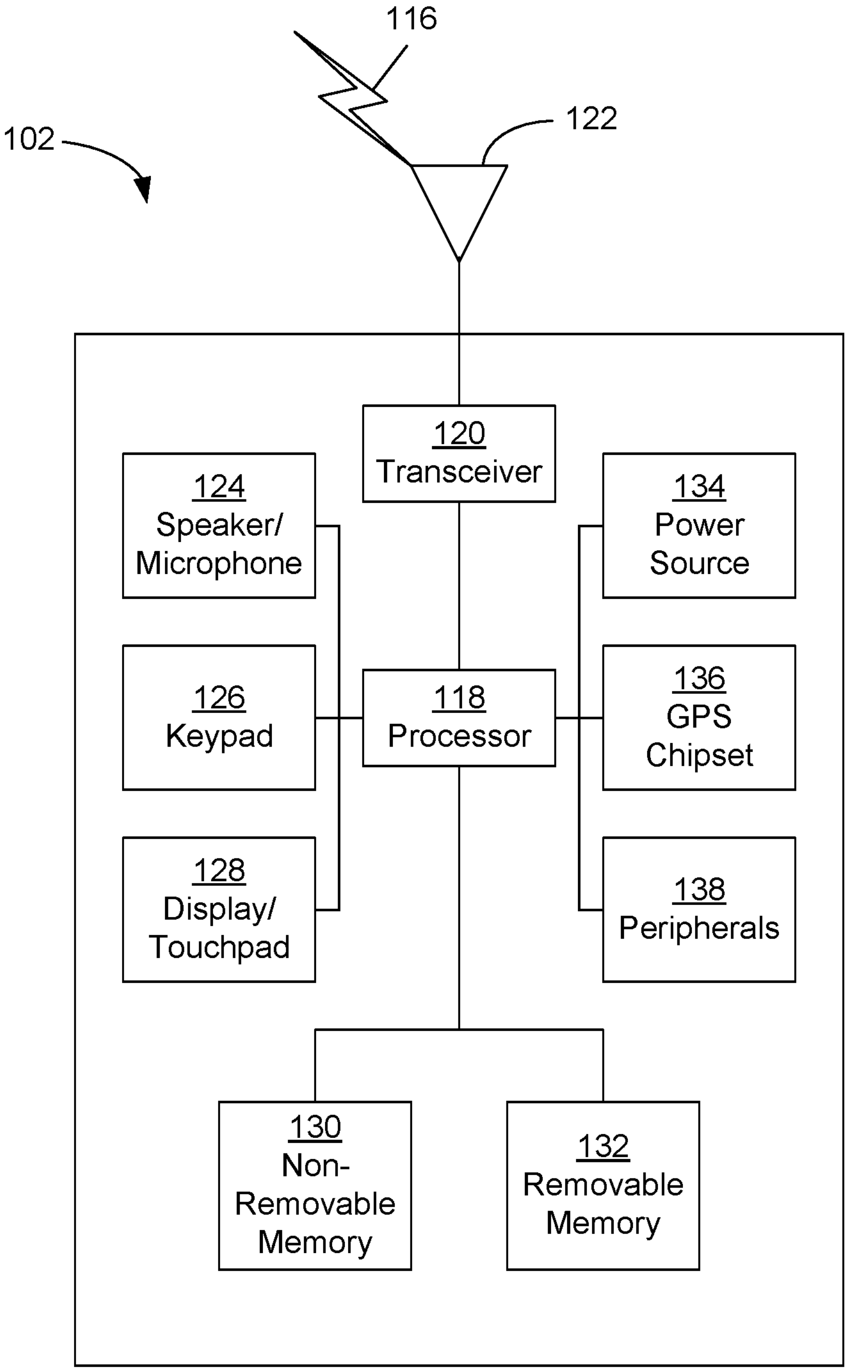
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134 and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
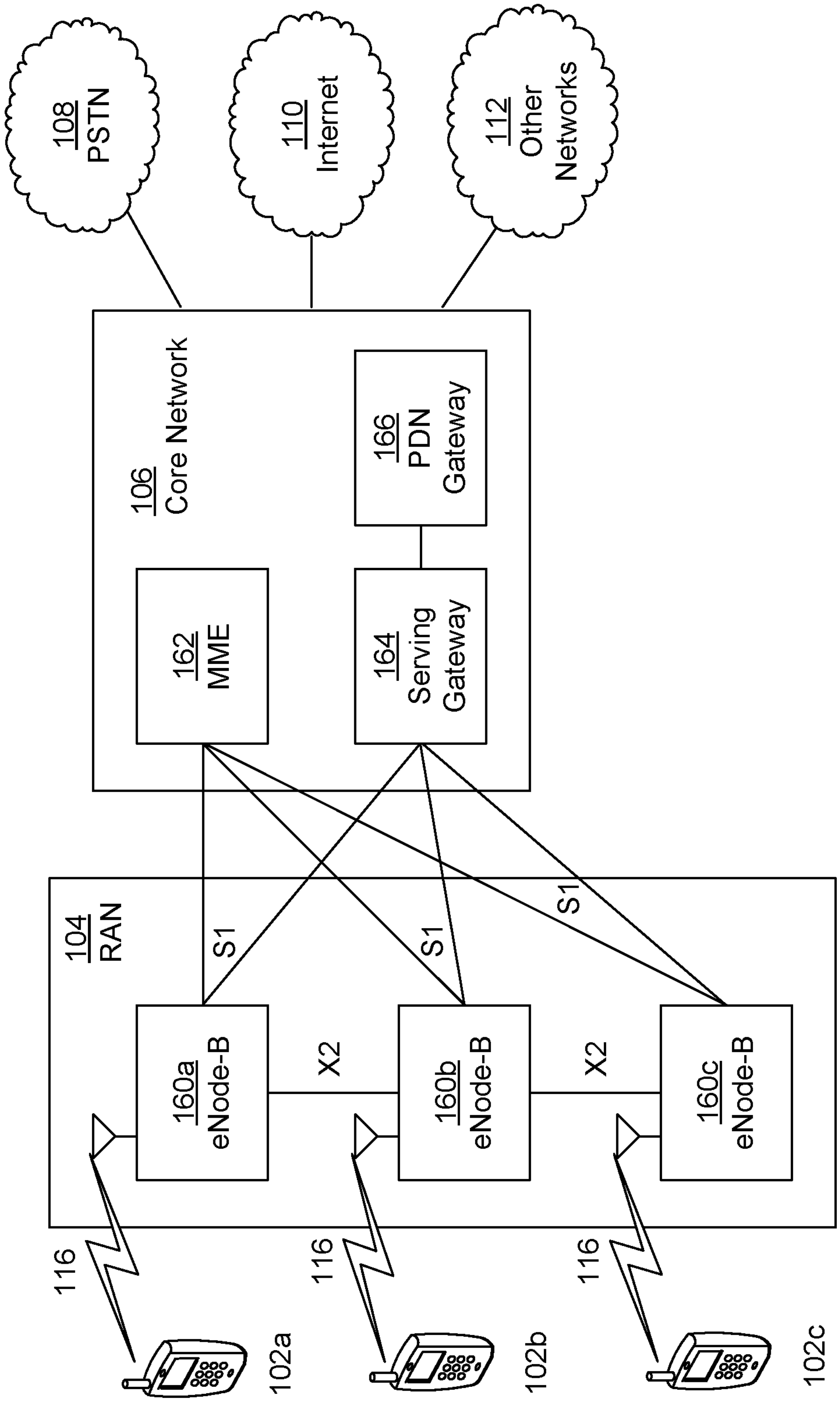
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an “ad-hoc” mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
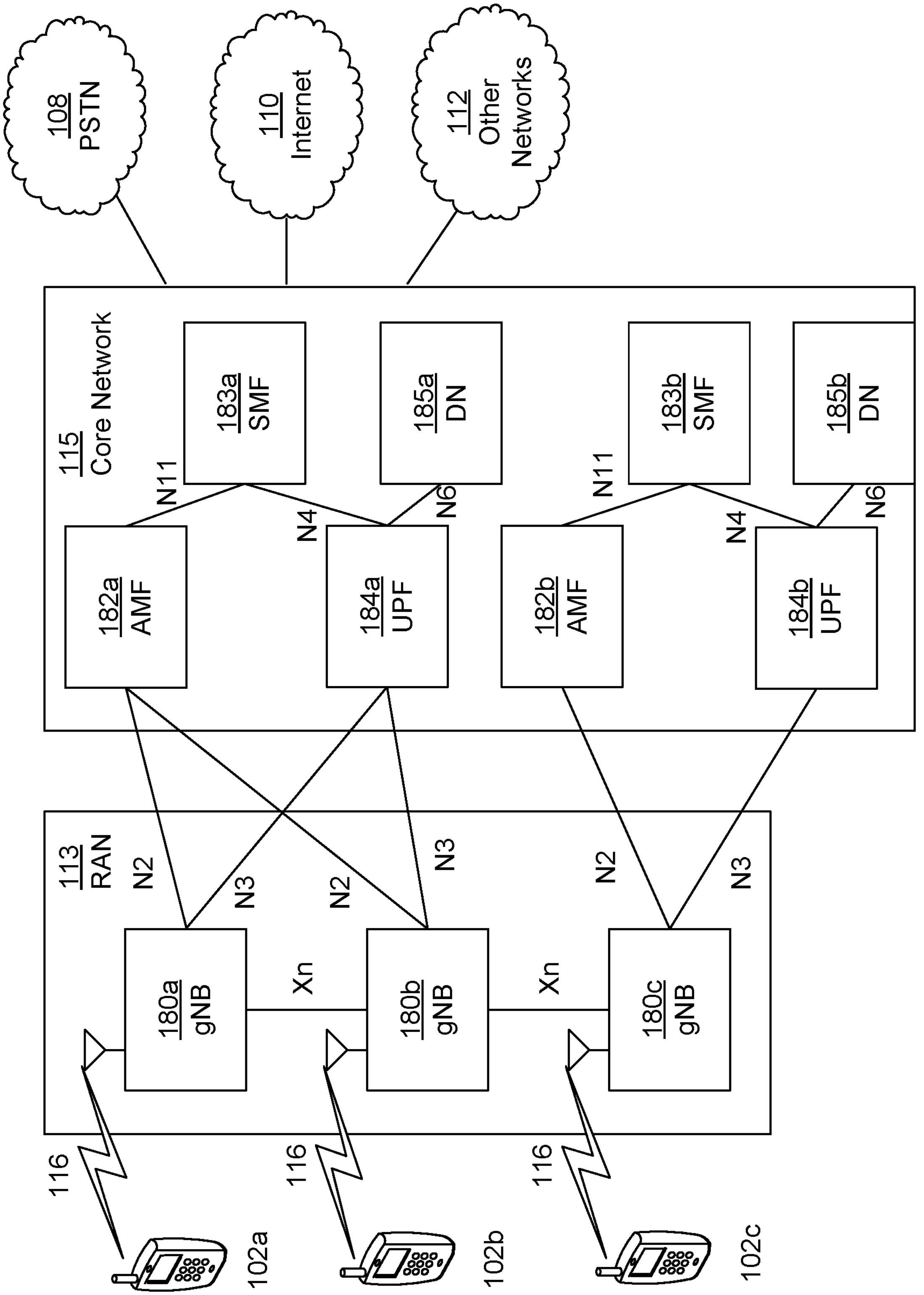
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

A WTRU-to-network relay may be used interchangeably with WTRU-to-NW relay, relay WTRU, relay, SL WTRU-to-network relay, SL WTRU-to-NW relay, and the like.

A relay WTRU may determine (e.g., based on condition (s), such as those described herein) whether to monitor paging for a remote WTRU. If a relay WTRU determines to monitor paging for a remote WTRU, the relay WTRU may monitor the discontinuous reception (DRX) cycle for paging monitoring, e.g., based on the Uu quality level indicated by the remote WTRU to the relay WTRU and/or the RRC state of the relay WTRU.

The relay WTRU may receive (e.g., from a network-side device, such as a base station, which may be a gNB or other device) configuration information indicating a respective monitoring pattern (e.g., respective PO monitoring pattern) for the relay WTRU to use based on a respective value or threshold associated with a respective remote WTRU Uu link quality (e.g., a respective value of the link quality). For example, the configuration information may be a configuration of what monitoring pattern for the relay WTRU to use based on a respective DRX cycle reduction for a respective remote WTRU Uu link quality value and/or a remote WTRU Uu link quality threshold (e.g., the configuration information may map a respective monitoring pattern for the relay WTRU to use to a respective remote WTRU Uu link quality value/threshold). If the relay WTRU is in RRC_IDLE, RRC_INACTIVE, or RRC_CONNECTED with DRX, the relay WTRU may monitor the paging occasions (POs) of the remote WTRU indicated in the configuration information, e.g., the relay WTRU may compute the POs of the remote WTRU to monitor based on a reduced DRX cycle associated with the received Uu link quality (e.g., the latest received Uu link quality), for example as indicated in the configuration information. If the relay WTRU is in RRC_CONNECTED and configured with common search space (CSS), the relay WTRU may monitor POs (e.g., all paging POs) of the remote WTRU, and the paging POs of the remote WTRU may be computed based on the DRX cycle (e.g., current DRX cycle) of the remote WTRU. The relay WTRU may indicate to the remote WTRU the portion and/or pattern of the remote WTRU's POs on which the relay WTRU may monitor and/or receive paging.

The remote WTRU may determine whether to monitor Uu paging and/or receive paging from the relay WTRU, e.g., based on the Uu link quality and/or an indication from the relay WTRU. The remote WTRU may receive (e.g., from a network-side device) a Uu quality threshold for receiving paging (e.g., via Uu and SL). The remote WTRU may send a Uu quality level to the relay WTRU. If the measured Uu quality is below the threshold and the remote WTRU is in coverage (e.g., still in coverage even though the Uu quality is below the threshold), the remote WTRU may monitor Uu for the POs of the remote WTRU and/or receive paging message(s) on SL from the relay WTRU (e.g., monitoring SL according to the paging DRX). If the measured Uu quality is above a threshold and the relay WTRU has not indicated it is monitoring the POs of the remote WTRU (e.g., all of the POs of the remote WTRU), the remote WTRU may monitor Uu for the POs of the remote WTRU and not receive paging message(s) on the SL from the relay WTRU (e.g., SL may not be monitored according to paging DRX). The remote WTRU may receive a paging message (e.g., only) on SL from the relay WTRU (e.g., no Uu monitoring).

In examples, sidelink (SL) relay (e.g., NR SL) may use both WTRU to network relays and WTRU to WTRU relays based on PC5 (sidelink).

In examples, a version of sidelink (e.g., NR sidelink) may focus on supporting V2X related road safety services. The design may aim to provide support for broadcast, groupcast and unicast communications in out-of-coverage and in-network coverage situations. Sidelink-based relaying functionality may include sidelink/network coverage extension, power efficiency improvement, and/or considering a range of applications and services.

Coverage for sidelink-based communication may be extended. In WTRU-to-network coverage extension, Uu coverage reachability may be used for WTRUs to reach a server in a PDN network and/or counterpart WTRU out of a proximity area. In examples, a WTRU-to-network relay may include EUTRA-based technology, and may not be applied to an NR-based system, e.g., for both NG-RAN and NR-based sidelink communication. In WTRU-to-WTRU coverage extension, proximity reachability may include a single-hop sidelink link (e.g., via EUTRA-based or NR-based sidelink technology). A single-hop sidelink link relay may not be sufficient if there is no Uu coverage at the location of the relay, e.g., considering the limited single-hop sidelink coverage. Sidelink connectivity may be extended (e.g., in an NR framework, e.g., to support the enhanced QoS requirements).

Single hop sidelink (e.g., NR sidelink) may be enhanced. Mechanism(s) for sidelink-based WTRU-to-network and WTRU-to-WTRU relay may focus on one or more of the following aspects for layer-3 relay and/or layer-2 relay: relay (re-)selection criterion and procedure; relay/Remote WTRU authorization; QoS for relaying functionality; service continuity; security of relayed connection; or impact on user plane protocol stack and/or control plane procedure, e.g., connection management of relayed connection.

Mechanism(s) to support upper layer operations of discovery model/procedure for sidelink relaying (e.g., assuming no new physical layer channel/signal) may be implemented.

In examples, a WTRU-to-network relay and a WTRU-to-WTRU relay may use the same relaying mechanism. Forward compatibility for multi-hop relay support may be implemented. In a layer-2 WTRU-to-network relay, the architecture of end-to-end PDCP and/or hop-by-hop RLC may be used.

Relaying via ProSe WTRU to Network relays may extend network coverage to an out of coverage WTRU (e.g., using PC5 (D2D) between an out of coverage WTRU and a WTRU-to-Network relay).

A ProSe WTRU-to-Network Relay may provide a generic L3 forwarding function that relays IP traffic between the Remote WTRU and the network. One-to-one and/or one-to-many sidelink communications may be used between the Remote WTRU(s) and the ProSe WTRU-to-Network Relay. For the Remote WTRU and Relay WTRU, one single carrier (e.g., a Public Safety ProSe Carrier) operation may be supported (e.g., Uu and PC5 may be the same carrier for Relay/Remote WTRU). The Remote WTRU may be authorized by upper layers and/or may be in-coverage of the Public Safety ProSe Carrier or out-of-coverage on (e.g., any) supported carriers, which may include a Public Safety ProSe Carrier for WTRU-to-Network Relay discovery, and/or (re) selection and communication. The ProSe WTRU-to-Network Relay may be in-coverage of EUTRAN. The ProSe WTRU-to-Network Relay and the Remote WTRU may perform sidelink communication and sidelink discovery.

Relay Selection for WTRU to NW Relays may be implemented.

Relay selection/reselection for ProSe WTRU to NW relays may be performed, e.g., based on AS layer quality measurements (RSRP) and/or upper layer criteria. In examples, a base station (e.g., an eNB) may control whether the WTRU acts as a ProSe WTRU-to-Network Relay. If the base station (e.g., the eNB) broadcasts information associated to ProSe WTRU-to-Network Relay operation, the ProSe WTRU-to-Network Relay operation may be supported in the cell. The base station (e.g., the eNB) may provide one or more of the following. The base station (e.g., the eNB) may provide transmission resources for ProSe WTRU-to-Network Relay discovery using broadcast signaling for RRC_IDLE state and dedicated signaling for RRC_CONNECTED state. The base station (e.g., the eNB) may provide reception resources for ProSe WTRU-to-Network Relay discovery using broadcast signaling. The base station (e.g., the eNB) may broadcast a minimum and/or a maximum Uu link quality (RSRP) threshold(s) that the ProSe WTRU-to-Network Relay respects before a WTRU-to-Network Relay discovery procedure is initiated. In RRC_IDLE, if the eNB broadcasts transmission resource pools, the WTRU may use the threshold(s) to autonomously start or stop the WTRU-to-Network Relay discovery procedure. In RRC_CONNECTED, the WTRU uses the threshold(s) to determine if the WTRU may indicate to the eNB that it is a Relay WTRU and wants to start ProSe WTRU-to-Network Relay discovery. If the base station (e.g., the eNB) does not broadcast transmission resource pools for ProSe-WTRU-to-Network Relay discovery, a WTRU may initiate a request for ProSe-WTRU-to-Network Relay discovery resources by dedicated signaling, e.g., respecting these broadcasted threshold(s).

A ProSe WTRU-to-Network Relay performing sidelink communication for ProSe WTRU-to-Network Relay operation may be in RRC_CONNECTED. In response to receiving a layer-2 link establishment request or TMGI monitoring request (e.g., upper layer message) from the Remote WTRU, the ProSe WTRU-to-Network Relay may indicate to the base station (e.g., the eNB) that the ProSe WTRU-to-Network Relay is a ProSe WTRU-to-Network Relay and intends to perform ProSe WTRU-to-Network Relay sidelink communication. The base station (e.g., the eNB) may provide resources for ProSe WTRU-to-Network Relay communication.

The remote WTRU may decide when to start monitoring for ProSe WTRU-to-Network Relay discovery. The remote WTRU may transmit ProSe WTRU-to-Network Relay discovery solicitation messages if the remote WTRU is in RRC_IDLE or in RRC_CONNECTED, e.g., depending on the configuration of resources for ProSe WTRU-to-Network Relay discovery. The base station (e.g., eNB) may broadcast a threshold, which may be used by the Remote WTRU to determine if it may transmit ProSe WTRU-to-Network Relay discovery solicitation messages, and/or to connect or communicate with a ProSe WTRU-to-Network Relay WTRU. The Remote WTRU (e.g., in RRC_CONNECTED) may use the broadcasted threshold to determine if it may indicate to the base station (e.g., eNB) that it is a Remote WTRU and wants to participate in ProSe WTRU-to-Network Relay discovery and/or communication. The base station (e.g., the eNB) may provide transmission resources (e.g., using broadcast or dedicated signaling) and/or reception resources (e.g., using broadcast signaling), e.g., for ProSe WTRU-to-Network Relay Operation. The Remote WTRU may stop using ProSe WTRU-to-Network Relay discovery and/or communication resources, e.g., if an RSRP goes above the broadcasted threshold. Exact time of traffic switching from Uu to PC5 or vice versa may be up to a higher layer.

The Remote WTRU may perform radio measurements at PC5 interface and may use the radio measurements for ProSe WTRU-to-Network Relay selection and/or reselection along with higher layer criterion. A ProSe WTRU-to-Network Relay may be considered suitable (e.g., in terms of radio criteria), e.g., if the PC5 link quality exceeds a configured threshold (e.g., pre-configured or provided by the eNB). The Remote WTRU may select the ProSe WTRU-to-Network Relay, which may satisfy higher layer criterion and/or have best PC5 link quality among suitable ProSe WTRU-to-Network Relays (e.g., all suitable ProSe WTRU-to-Network Relays).

The Remote WTRU may trigger ProSe WTRU-to-Network Relay reselection, e.g., if a PC5 signal strength of a current ProSe WTRU-to-Network Relay is below a configured signal strength threshold and/or if the remote WTRU receives a layer-2 link release message (e.g., upper layer message) from the ProSe WTRU-to-Network Relay.

Figure 2:
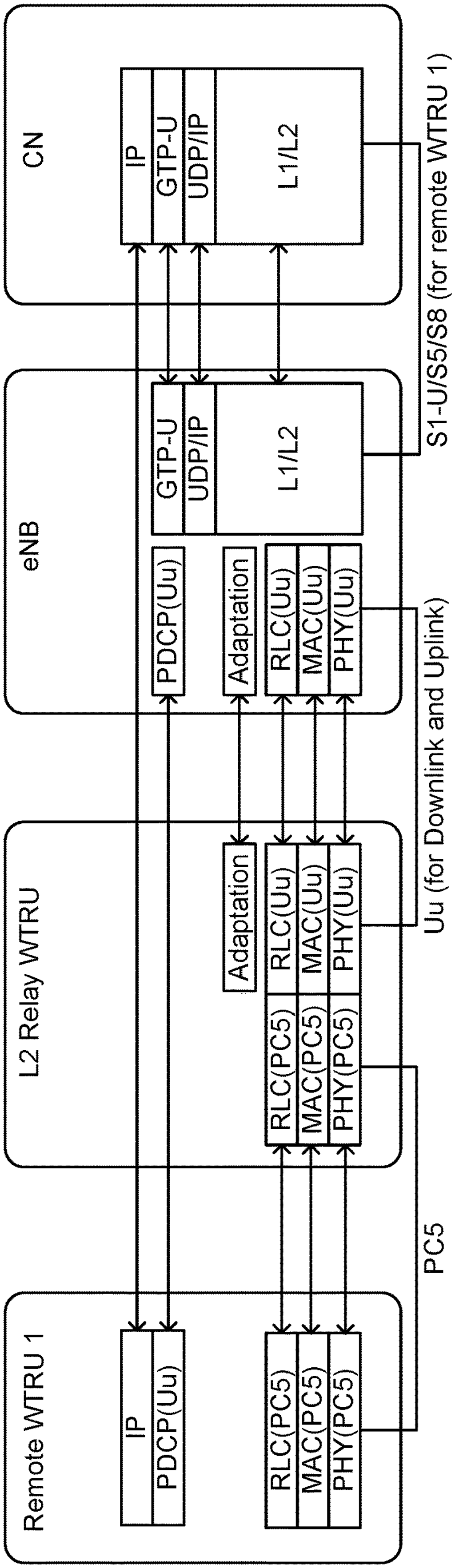
FIG. 2 illustrates an example user plane radio protocol stack for a layer 2 evolved WTRU-to-Network relay (PC5).
Figure 3:
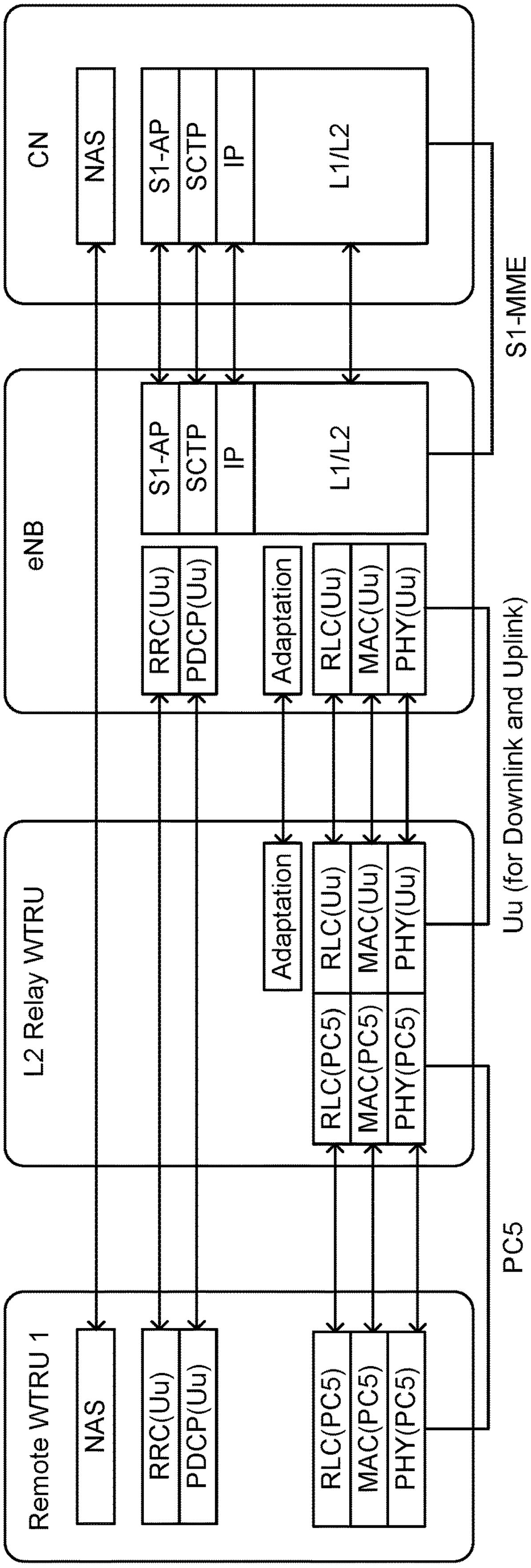
FIG. 3 illustrates an example control plane radio protocol stack for a layer 2 evolved WTRU-to-Network relay (PC5).

WTRU to NW relays may be implemented for wearables and IoT devices. The WTRU to NW relays for wearables may be a L2 relay based on the protocol stacks shown in FIGS. 2 and 3. FIG. 2 illustrates an example user plane radio protocol stack for layer 2 evolved WTRU-to-Network relay (PC5). FIG. 3 illustrates an example control plane radio protocol stack for layer 2 evolved WTRU-to-Network relay (PC5).

Connection establishment for Unicast links in NR V2X may be implemented.

In examples, a one to one communication link may be established at upper layers (e.g., ProSe layer) between two WTRUs (e.g., the remote WTRU and WTRU to NW relay). The connection (e.g., the communication link) may be transparent to the AS layer and connection management signaling and procedures performed at the upper layers may be carried by AS layer data channels. The AS layer may be unaware of such one to one connection.

In examples (e.g., in NR V2X), the AS layer may support the notion of a unicast link between two WTRUs. The unicast link may be initiated by upper layers (e.g., as in the ProSe one-to-one connection). The AS layer may be informed of the presence of the unicast link, and/or data that is transmitted in unicast fashion between the peer WTRUs. With the knowledge (e.g., of the presence of the unicast link, and/or data that is transmitted in unicast fashion between the peer WTRUs), the AS layer may support HARQ feedback, CQI feedback, and/or power control schemes which are specific to unicast.

A unicast link at the AS layer may be supported, e.g., via a PC5-RRC connection. The PC5-RRC connection may be defined as follows. A PC5-RRC connection may be a connection (e.g., a logical connection) between a pair of a Source Layer-2 ID and a Destination Layer-2 ID in the AS. One PC5-RRC connection may correspond to one PC5 unicast link. The PC5-RRC signaling may be initiated in response to its corresponding PC5 unicast link establishment (e.g., after its corresponding PC5 unicast link establishment). The PC5-RRC connection and the corresponding sidelink SRBs and sidelink DRBs may be released if the PC5 unicast link is released (e.g., as indicated by upper layers).

In a PC5-RRC connection of unicast, one sidelink SRB may be used to transmit the PC5-S messages before the PC5-S security has been established. One sidelink SRB may be used to transmit the PC5-S messages to establish the PC5-S security. One sidelink SRB may be used to transmit the PC5-S messages after the PC5-S security has been established, which may be protected. One sidelink SRB may be used to transmit the PC5-RRC signaling, which may be protected and may be sent after the PC5-S security has been established.

PC5-RRC signaling may include a sidelink configuration message (e.g., a reconfiguration message, such as RRCReconfigurationSidelink), where one WTRU may configure the RX-related parameters of SLRB(s) (e.g., each SLRB) in the peer WTRU. The reconfiguration message may configure the parameters of a (e.g., each) protocol in the L2 stack (SDAP, PDCP, etc.). The receiving WTRU may confirm or reject the configuration, e.g., depending on whether the receiving WTRU supports the configuration suggested by the peer WTRU.

Paging for WTRU (e.g., NR WTRU) to NW Relays may be implemented. SL WTRU to NW relays may be implemented (e.g., in NR). One or more of the following may be implemented for the paging mechanism (e.g., in L2 WTRU to NW relays). A relay WTRU may monitor the POs of the remote WTRU (e.g., a portion of the POs of the remote WTRU as described herein). The relay WTRU may forward a paging message intended for the remote WTRU that was received by the relay WTRU in one or more of the monitored POs, for example the relay WTRU may send an indication of the received paging message to the remote WTRU. A remote WTRU may send its WTRU ID (e.g., a TMSI/IRNTI) and/or WTRU specific DRX cycle to the relay WTRU (e.g., for the relay WTRU to compute the POs of the remote WTRU and/or a portion of the POs of the remote WTRU to monitor, for example as described herein). A relay WTRU may receive an indication to start/stop PO monitoring (e.g., to handle the case where the remote WTRU is in RRC_CONNECTED). A relay WTRU may receive paging for remote WTRU in dedicated RRC signaling, e.g., if the relay WTRU is in RRC_CONNECTED and not configured with CSS.

As described herein, a WTRU may be characterized by its RRC state to be RRC_CONNECTED, RRC_INACTIVE, or RRC_IDLE (e.g., the different RRC states may be associated with different activity levels). The WTRU behavior associated with these states may be as follows. In the case of RRC_IDLE, the WTRU behavior may include the following: PLMN selection; broadcast of system information; cell re-selection mobility; paging for mobile terminated data is initiated by 5GC; and/or DRX for CN paging configured by NAS. In the case of RRC_INACTIVE, the WTRU behavior may include the following: PLMN selection; broadcast of system information; cell re-selection mobility; that paging is initiated by NG-RAN (RAN paging); that RAN-based notification area (RNA) is managed by NG-RAN; DRX for RAN paging configured by NG-RAN; that 5GC-NG-RAN connection (e.g., control/user-planes) is established for WTRU; that the WTRU AS context is stored in NG-RAN and the WTRU; and/or that NG-RAN knows the RNA which the WTRU belongs to. In the case of RRC_CONNECTED, the WTRU behavior may include the following: that 5GC-NG-RAN connection (e.g., Control/User-planes) is established for WTRU; that the WTRU AS context is stored in NG-RAN and the WTRU; that NG-RAN knows the cell which the WTRU belongs to; transfer of unicast data to/from the WTRU; and/or network controlled mobility including measurements.

SL WTRU to NW relays may focus on out-of-coverage (OOC) remote WTRU(s). A remote WTRU may operate in multipath, e.g., if in coverage (e.g., one path over a direct Uu, and another path via an SL WTRU to NW relay). This may allow for flexible paging reception from the network and/or the relay WTRU. The flexible paging reception may allow the WTRU to receive paging via the Uu interface and/or the SL interface, which may increase the reliability of paging reception. Having the flexibility to receive paging from Uu may reduce the burden on the relay WTRU for monitoring paging for (e.g., all) remote WTRUs (e.g., even if such remote WTRUs are in coverage), which may be a limitation in some examples (e.g., a relay that focuses on OOC WTRUs). To enable this flexibility, procedures may confirm that paging is delivered on a correct path, e.g., regardless of the RRC state(s) of a WTRU (e.g., each WTRU), and/or the coverage situation(s) of a WTRU (e.g., each WTRU). Introducing PO reception on both interfaces (e.g., links) may result in more SL and Uu resource overhead.

Paging Monitoring for Multipath WTRU to NW Relay may be implemented.

Signaling for determining paging monitoring path(s) may be implemented.

Signaling may be used to exchange information for deciding the paging monitoring path of the remote WTRU and/or paging monitoring of the relay, and/or may be used to communicate that decision. The signaling disclosed herein is not limited to the purposes of reception of paging; the same signaling may be applied for determination of the path for SI request/reception and/or whether the relay WTRU may forward system information to the remote WTRU.

A remote WTRU and relay WTRU may be involved in signaling (e.g. via PC5-RRC), which may determine whether or not the relay WTRU monitors paging on behalf of the remote WTRU, the intensity of paging monitoring by the relay WTRU, whether the remote WTRU monitors paging on Uu, the intensity of paging monitoring by the remote WTRU on Uu, whether the remote WTRU monitors SL for paging, and/or the intensity of SL monitoring by the remote WTRU. The above (e.g., each of the above) may be determined by the same or different conditions. For example, the remote WTRU may have a set of conditions to determine whether to monitor Uu, a set of conditions to determine whether to monitor SL, and a set of conditions to determine whether to inform the relay WTRU of whether/how to monitor paging on behalf of the remote WTRU.

Paging monitoring behavior may include a decision of whether paging is monitored on a link by a WTRU (e.g., whether the remote WTRU monitors paging on Uu and/or whether the relay WTRU monitors paging on behalf of the remote WTRU), and the intensity of the paging monitoring. Intensity may include one or more of the following factors. A factor may be an amount/number of paging occasions (e.g., out of all paging occasions for the remote WTRU) monitored. A factor may be a pattern of paging occasions or a set of parameters, which may determine a subset/pattern of the paging occasions of the remote WTRU that are monitored (e.g., actually monitored). A factor may be the beams monitored during a paging occasion.

Figure 4:
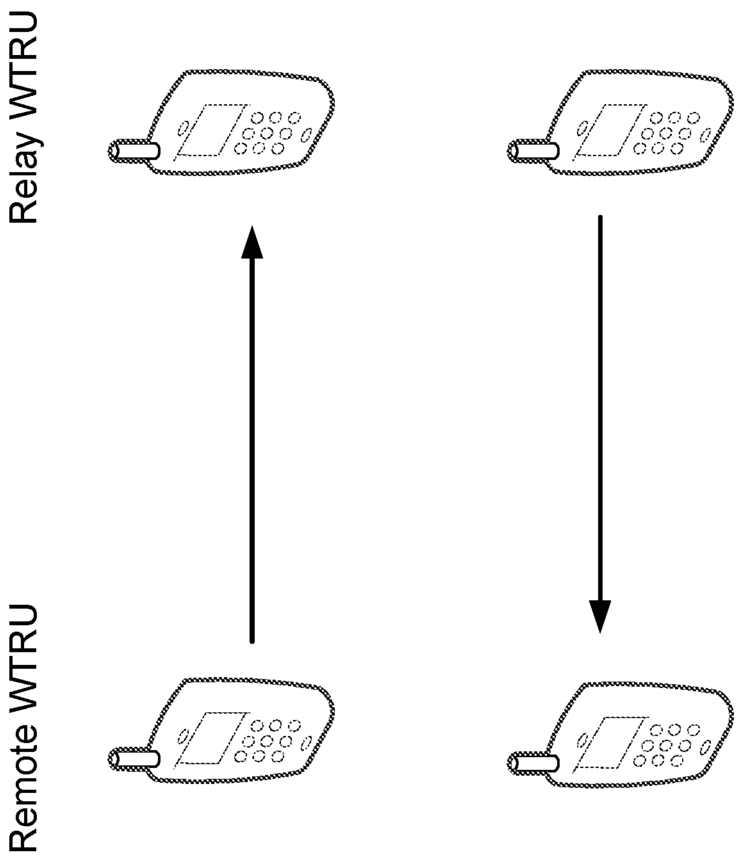
FIG. 4 illustrates an example of one-way signaling.

Signaling may be one-way. FIG. 4 illustrates an example of one-way signaling.

For example, signaling may be relay to remote. In examples, the relay WTRU may determine its own paging monitoring behavior and/or the paging monitoring behavior of the remote WTRU and may communicate the paging monitoring behavior to the remote WTRU. In examples, the relay WTRU may determine its own paging monitoring behavior and may communicate information (e.g., the relay's paging monitoring behavior and/or measurements) to the remote WTRU, e.g., to allow the remote WTRU to determine its own paging monitoring behavior.

For example, signaling may be remote to relay. In examples, the remote WTRU may determine its own paging monitoring behavior and/or the paging monitoring behavior of the relay WTRU and may communicate the latter to the relay WTRU. In examples, the remote WTRU may determine its own paging monitoring behavior and may send information (e.g., the remote WTRU paging monitoring behavior and/or measurements) to the relay WTRU, e.g., to allow the relay WTRU to determine its own paging monitoring behavior.

Figure 5:
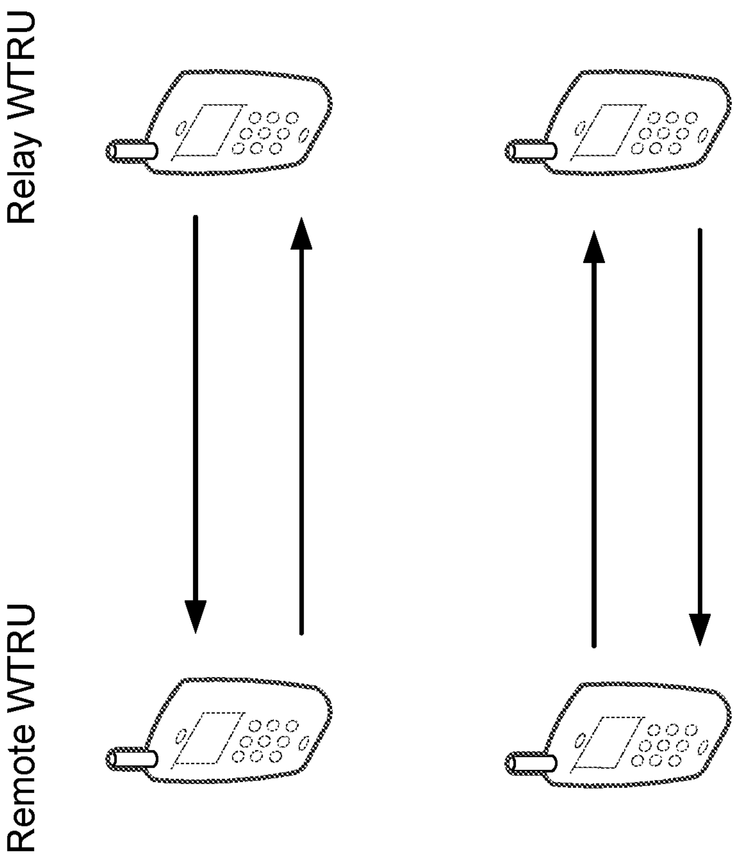
FIG. 5 illustrates an example of two-way signaling.

Signaling may be two-way. FIG. 5 illustrates an example of two-way signaling.

For example, signaling may be initiated by the relay WTRU. In examples, the relay WTRU may send assistance information (e.g., configuration information or measurements) to the remote WTRU. The remote WTRU may determine the paging behavior of the remote WTRU and/or the relay WTRU (e.g., using the assistance information and/or other information at the remote WTRU), and may send the decision (e.g., the determined paging behavior) to the relay WTRU. In examples, the relay WTRU may decide the paging behavior of the relay WTRU and/or the remote WTRU, and the remote WTRU (e.g., in response to receiving the paging behavior) may accept the paging behavior, reject the paging behavior, and/or provide the final paging behavior in a response message.

For example, signaling may be initiated by the remote WTRU. In examples, the remote WTRU may send assistance information (e.g., configuration information or measurements) to the relay WTRU. The relay WTRU may determine the paging behavior for the relay and/or remote WTRU and may send the decision to the remote WTRU. In examples, the remote WTRU may decide the paging behavior of the relay and/or remote WTRU and may send the paging behavior to the relay WTRU. The relay WTRU (e.g., upon receiving the paging behavior) may accept the paging behavior, reject the paging behavior, and/or provide the final paging behavior in a response message.

Figure 6:
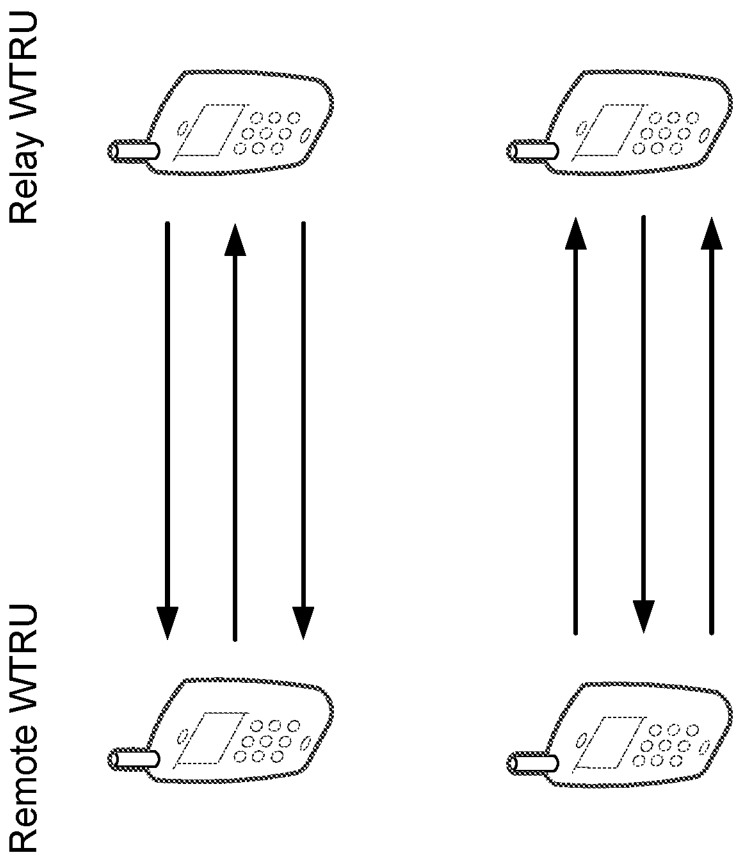
FIG. 6 illustrates an example of three-way signaling.

Signaling may be three-way. FIG. 6 illustrates an example of three-way signaling.

For example, signaling may be initiated by the relay WTRU. In examples, the relay WTRU may send assistance information to the remote WTRU. The remote WTRU may decide the paging behavior and may communicate the paging behavior to the relay WTRU. The relay WTRU may confirm/reject and/or may provide an alternative behavior. In examples, the relay WTRU may make a decision about the paging behavior at the relay WTRU and may communicate the decision to the remote WTRU. The remote WTRU may make a decision about the paging behavior at the remote WTRU and may communicate the decision to the relay WTRU. The relay WTRU may adjust its relay paging behavior, e.g., based on the remote WTRU decision. In examples, the relay WTRU may make a decision about the paging behavior at the relay and/or remote WTRU and may communicate the decision to the remote WTRU. The remote WTRU may provide an alternate decision to the relay WTRU. The relay WTRU may confirm/reject, or may provide an (e.g., another) alternate behavior.

For example, signaling may be initiated by the remote WTRU. In examples, the remote WTRU may send assistance information to the relay WTRU. The relay WTRU may decide the paging behavior and may communicate the decision to the remote WTRU. The remote WTRU may confirm/reject and/or may provide an alternative behavior. In examples, the remote WTRU may make a decision about the paging behavior at the remote WTRU and may communicate the decision to the relay WTRU. The relay WTRU may make a decision about the paging behavior at the relay WTRU and may communicate the decision to the remote WTRU. The remote WTRU may adjust its relay paging behavior based on the relay WTRU decision. In examples, the remote WTRU may make a decision about the paging behavior at the remote and/or relay WTRU and may communicate the decision to the relay WTRU. The relay WTRU may provide an alternate decision to the remote WTRU. The remote WTRU may confirm/reject, or may provide an alternate behavior.

In the signaling negotiations (e.g., any of the signaling negotiations) for determining which WTRU will monitor which POs, if the reject is sent by the relay WTRU, the remote WTRU may trigger relay reselection. Relay reselection may be conditioned on other factors described herein (e.g., if Uu RSRP is below a threshold).

Factors may be implemented for determining the paging behavior of the relay/remote WTRU.

Factors/rules may be used for determining the paging behavior of the remote and/or relay WTRU and/or transmitting the paging behavior from the remote/relay to the relay/remote. Examples associated with the factors/rules disclosed herein may be used in and/or extended to the signaling mechanisms described herein, for example, by assuming that a decision may be made at a WTRU and may be sent to another WTRU. The information used make the decision may be sent to another WTRU, and the corresponding decision may be sent back, etc. The examples associated with the factors/rules described herein may be made to operate using the signaling described herein.

Factors may be implemented in determining paging behavior of a remote WTRU and/or factors may be implemented in communicating paging behavior of a remote WTRU to relay.

A remote WTRU (e.g., in coverage) may monitor paging (e.g., on Uu) and/or rely on its attached relay WTRU to monitor paging. A remote WTRU (e.g., in coverage) may request a relay WTRU to monitor paging on its behalf, e.g., if the remote WTRU decides to monitor paging on SL. For example, the remote WTRU may have its relay WTRU monitor for and/or forward paging intended for the remote WTRU, for example, the relay WTRU may monitor POs of the remote WTRU as described herein (e.g., in accordance with received configuration information indicating a monitoring pattern to use based on a link quality).

Monitoring paging on Uu may include decoding a PDCCH, e.g., at the paging occasion associated with the PO of the remote WTRU, and/or at predefined PDCCH slots (e.g., other predefined PDCCH slots). Not monitoring paging on Uu may include not decoding PDCCH. Monitoring paging on SL (e.g., relying on the relay) may include decoding SL (e.g., continuously) or decoding SL at predefined or configured SL slots, which may be associated with the timing of the POs of the remote WTRU's.

A remote WTRU and/or a relay WTRU may make the decision about (or a relay WTRU may provide information to the remote WTRU enabling a decision about) whether paging may be monitored on Uu, and/or on SL (e.g., by receiving paging from the attached relay WTRU), e.g., based on one or more of the following factors at the remote WTRU.

A factor may be an RRC state of the remote WTRU. For example, the remote WTRU may not monitor paging on Uu and/or may disable paging monitoring at the relay WTRU, e.g., if the remote WTRU is in a RRC_CONNECTED state. For example, the remote WTRU may monitor paging on Uu, e.g., if (e.g., only if) the RRC state of the relay WTRU is RRC_IDLE/RRC_INACTIVE. The remote WTRU may monitor paging on SL, e.g., if (e.g., only if) the RRC state of the relay WTRU is RRC_CONNECTED. For example, if the remote WTRU is in RRC_INACTIVE, the remote WTRU may determine the link to monitor, e.g., based on bearer configuration. If the remote WTRU is in RRC_IDLE, the remote WTRU may determine the link to monitor, e.g., based on (e.g., use) a (e.g., another) rule described herein.

A factor may be support of multipath by the remote WTRU. In examples, the remote WTRU may provide multipath support capability to the relay WTRU. If the remote WTRU does not support multipath, the relay WTRU may monitor paging for the remote WTRU. If the relay WTRU supports multipath, the relay WTRU may determine whether to monitor paging for the remote WTRU, e.g., based on factors/conditions described herein.

A factor may be Uu measurements of cell quality. In examples, the remote WTRU may monitor paging on Uu if it is in coverage. The remote WTRU may be configured with a Uu threshold quality, above which it may monitor paging on Uu. The remote WTRU may monitor paging on Uu, e.g., if (e.g., only if) the Uu quality is above a first threshold. The remote WTRU may monitor paging on Uu and paging on SL, e.g., if the Uu quality is between a first threshold and a second threshold. The remote WTRU may monitor paging on SL, e.g., if (e.g., only if) the Uu quality is below a second threshold.

A factor may be SL measurements. In examples, the remote WTRU may monitor paging on SL, e.g., if a channel busy ratio (CBR) is below a threshold. The remote WTRU may monitor paging on SL, e.g., if the SL RSRP is below a threshold.

A factor may be SL and/or Uu Link conditions. For example, the remote WTRU may initiate monitoring of Uu paging, e.g., if SL RLF is detected or based on some condition for measuring SL RLF (e.g., if a number of consecutive HARQ DTX reaches a certain value). Measurement of SL RLF may be associated with a PC5-RRC link to the relay WTRU, and/or may be associated with a (e.g., another) PC5-RRC connection being monitored at the remote WTRU. For example, the remote WTRU may initiate monitoring of paging on SL (and may indicate such to the relay WTRU), e.g., if the remote WTRU detects Uu RLF over a direct link.

A factor may be a frequency and/or nature of the carrier on Uu and/or SL. In examples, the remote WTRU may monitor for paging, e.g., on the link (Uu or SL) (e.g., only on the link) that is not associated with unlicensed. The remote WTRU may monitor on the link whose frequency is lower.

A factor may be information/indication from the relay WTRU. In examples, the remote WTRU may receive an indication or information from the relay WTRU, which may be used to determine the link to monitor for paging. The relay WTRU may reject a request by the remote WTRU to have the relay WTRU monitor paging on behalf of the remote WTRU. The relay WTRU may send a relay-initiated indication that it may not monitor paging (e.g., may no longer monitor paging) for the remote WTRU. The remote WTRU may monitor paging on Uu (e.g., only) (e.g., as a result of the relay-initiated indication). In examples, the relay WTRU may send measurements (e.g., flow control measurements, Uu measurements, number of connected remote WTRUs, number of remote WTRUs whose POs are monitored, or paging occasions monitored by the relay, etc.), which may be used by the remote WTRU to determine the link over which to monitor paging. In examples, the remote WTRU may be configured with conditions (e.g., a combination of conditions) for monitoring paging on Uu, one of which may be that the POs monitored by the relay WTRU is below a threshold. In examples, the relay WTRU may determine (e.g., based on factors described herein) a set of POs of the remote WTRU it may monitor on Uu and may provide this information (e.g., in the form of DRX parameters or an actual pattern of POs) to the remote WTRU. The remote WTRU may monitor (e.g., only monitor) the POs on Uu which the relay is not (e.g., is not already) monitoring.

A factor may be Uu and/or an SL DRX configuration of the remote WTRU and/or relay WTRU. For example, whether the remote WTRU decides to monitor paging on SL and/or Uu may depend on the SL DRX configuration provided to the remote WTRU by the network/peer WTRU(s) and/or the overall active monitoring pattern of the remote WTRU, which may be in comparison with the remote WTRU's Uu paging occasions. If the remote WTRU's Uu paging occasions occur, e.g., during the SL DRX inactive time, the remote WTRU may perform paging monitoring on Uu. If the remote WTRU has an active time configured for at least a period of time T1 after the remote WTRU's paging occasions, the remote WTRU may monitor paging on SL. The remote WTRU may (e.g., may otherwise) monitor paging on Uu. If the remote WTRU has an active time that occurs no more than T2 time after the PO, and/or no less than T3 after the active time, the remote WTRU may monitor paging on SL. The remote WTRU may (e.g., may otherwise) monitor paging on Uu. The remote WTRU may receive the SL and/or Uu DRX from its relay WTRU. The remote WTRU may monitor its POs on Uu, which may not fall in the SL and/or Uu active time of the relay WTRU.

A factor may be a number of hops/paths. For example, if the number of hops via the relayed path is above a threshold, the remote WTRU may monitor for paging on Uu (e.g., paging only on Uu).

A factor may be bearer path configuration information. In examples, the remote WTRU may monitor for paging, e.g., based on configuration information of one or more bearers.

The remote WTRU may monitor paging on the link which is configured as a primary path for a bearer (e.g., a signaling bearer), or may monitor paging on a path which is associated with some action of the WTRU making it a primary path (e.g., transmission of RRC message, prioritized for transmission of data, etc.).

A factor may be PC5-RRC connections (e.g., other PC5-RRC connections) the remote WTRU may have (e.g., apart from that of the relay). For example, if the remote WTRU has PC5-RRC connections (e.g., other PC5-RRC connections), which may be active (e.g., the remote WTRU is performing active SL monitoring as a result of the connections, or the remote WTRU is performing SL communications (e.g., for groupcast/broadcast)), and the remote WTRU may monitor the SL link for paging.

A factor may be the remote WTRU configured data priority. For example, the remote WTRU may monitor paging on Uu and SL, e.g., if the remote WTRU is in RRC_INACTIVE and/or the remote WTRU is configured with at least one high priority bearer (e.g., priority may be a function of a parameter configured for a bearer).

A factor may be configured (e.g., configured explicitly) by a network. In examples, the remote WTRU may be configured by the network to monitor paging on Uu (e.g., if the remote WTRU is in coverage and/or Uu RSRP is above a threshold), and/or SL. Such configuration information may be dedicated or system information broadcast (SIB). In examples, the configuration information may be in SIB for a remote WTRU in RRC_IDLE. The configuration information may be in dedicated signaling for a remote WTRU in RRC_INACTIVE. The configuration information may be in dedicated signaling (e.g., via the release message) for RRC_IDLE. The configuration may also be configured per bearer. A bearer configured at the remote WTRU may indicate whether a remote WTRU (e.g., if moving to RRC_INACTIVE) monitors paging on Uu (e.g., if possible) and/or SL. In examples, the network may explicitly configure the remote WTRU and/or the relay WTRU, e.g., with a subset of the POs to be monitored on Uu (e.g., by (e.g., effective) DRX pattern configuration information, or similar parameter(s) describing the pattern of POs).

Factors at the relay WTRU may be implemented.

A factor may be an RRC state of the relay WTRU. In examples, the remote WTRU may monitor paging on SL, e.g., if the relay WTRU is in RRC_CONNECTED. In examples, the condition used by the remote WTRU to determine whether to monitor paging on Uu and/or on SL may be different, e.g., depending on whether the relay WTRU is in RRC_CONNECTED, or in RRC_IDLE/RRC_INACTIVE.

A factor may be a number of connected remote WTRUs. In examples, the remote WTRU may receive paging from Uu, and the relay WTRU may not perform paging monitoring on behalf of the remote WTRU, e.g., if the number of connected remote WTRUs for a relay WTRU is larger than a threshold. In examples, the intensity of monitoring of the remote WTRU's POs may be a function of a number of remote WTRUs connected to the relay.

A factor may be a total amount of monitored POs and/or percentage of time monitoring Uu for paging. In examples, the remote WTRU may receive paging from Uu. The relay WTRU may not perform paging monitoring on behalf of the remote WTRU, e.g., if the percentage of time the relay WTRU monitors paging on Uu (e.g., assuming an IDLE/INACTIVE relay WTRU) is larger than a threshold.

A factor may be CSS configuration information at the relay WTRU. For example, if the relay WTRU is in RRC_CONNECTED and configured in a BWP without CSS, the remote WTRU may decide to receive paging from Uu (e.g., only), or may decide to receive paging from SL (e.g., only).

A factor may be a Uu CONNECTED DRX pattern of the relay WTRU (e.g., assuming a CONNECTED relay WTRU). For example, if the relay WTRU's Uu DRX active periods overlap with the remote WTRU's POs, the relay WTRU may monitor paging for the remote WTRU. The remote WTRU may receive paging on SL.

A factor may be a Uu connection status. For example, if the relay WTRU detects Uu radio link failure (RLF), it may send an indication to the remote WTRU. The remote WTRU (e.g., in response to reception of the indication) may monitor paging on Uu (e.g., Uu only) (e.g., if possible). If the relay WTRU recovers from Uu RLF, it may send a second indication to the remote WTRU. The remote WTRU may (e.g., may then) resume monitoring of paging, e.g., via SL (e.g., in addition to Uu, or SL alone).

Combination(s) of the criteria described here may be used. A combination of factors that are associated with different WTRUs may require communicating a factor to the other WTRU and having the other WTRU take a decision. A combination may include (e.g., may be) selecting a first path (e.g., monitoring paging on Uu (e.g., only)), e.g., if a first condition and/or a second condition is met, and may include selecting a second path (e.g., SL only), e.g., if otherwise. A combination may include selecting a first path under a first condition and selecting a first path or a second path based on a combination of other conditions. A combination may include selecting a first or a second path based on a combination (e.g., via comparison) of two criteria (e.g., different criteria) (e.g., SL quality and Uu quality). A combination may include using a first condition to determine whether to use a second condition or a third condition, e.g., to determine whether to use Uu or SL. Independent condition(s) may be applied to the monitoring of paging on SL and/or Uu. The same condition may be applied to determine which of the links (or whether both links) are monitored for paging. Combinations(s) described herein do not preclude other combination(s).

Factors at the relay/remote WTRU may determine the paging intensity, which may be at a relay WTRU or a remote WTRU (e.g., each of the relay and remote WTRUs).

One or more of the factors described herein at the relay/remote WTRU may be used to determine the paging intensity at the remote or relay WTRUs. Paging intensity may be defined as one or more of the following. Paging intensity may be an overall percentage of the POs or paging frames (e.g., of the remote WTRU), e.g., over a given time, which may be monitored by the relay WTRU. Paging intensity may be an overall percentage of the POs or paging frames (e.g., of the remote WTRU) over a given time, which the remote WTRU may monitor on Uu. Paging intensity may be a (e.g., specific) pattern of POs or paging frames of the remote WTRU (e.g., which may be given by an equation), which may be monitored by the relay WTRU, or the remote WTRU on Uu. Paging intensity may be a percentage of beams or time slots for a PO, which the relay WTRU may monitor on behalf of the remote WTRU. Paging intensity may be a percentage of beams or time slots for a PO, which the remote WTRU may monitor on Uu. Paging intensity may be a (e.g., specific) pattern of beams or time slots for a PO of the remote WTRU, which may be monitored by the relay WTRU or may be monitored by the remote WTRU on Uu.

The relay and remote WTRU may share paging occasions, beams, etc., e.g., for monitoring the remote WTRU's paging on Uu. In examples, the remote WTRU may monitor a first set of POs, and the relay WTRU may monitor a second set of POs (e.g., non-overlapping POs). The remote WTRU may (e.g., for the POs monitored by the relay WTRU) monitor SL at a time relative to the POs, e.g., to receive a paging message (e.g., a possible paging message) from the relay WTRU. In examples, the remote WTRU and relay WTRU may monitor overlapped POs (e.g., to increase the reliability of paging reception). The remote WTRU may monitor (e.g., may monitor all of) the POs on Uu, and the relay WTRU may monitor a subset of the POs on behalf of the remote WTRU.

In examples, the factors described herein may be used to determine the paging intensity at each/either WTRU (e.g., of the remote WTRU and the relay WTRU). The relay/remote WTRU may determine the (e.g., specific) POs to be monitored, e.g., based on the factors described herein and/or (e.g., some specific) rule(s) (e.g., calculation of the POs or PO pattern as a function of those factors). In examples, the relay/remote WTRU may exchange the pattern of POs that a (e.g., each) WTRU intends to monitor with the other WTRU (e.g., using the x-way (e.g., one-way, two-way, or three-way) signaling described herein), and the other WTRU may use this information to determine its own monitoring intensity. The determination may be based on the factors described herein. In examples, the WTRU may determine the intensity based on its own WTRU implementation. Rules may be used to determine the PO monitoring pattern of the other WTRUs, e.g., based on the pattern received by the peer WTRU. For example, the relay WTRU may send the pattern of POs to be monitored, and the remote WTRU may determine to monitor on Uu the POs not monitored by the relay.

A remote WTRU may trigger relay reselection, e.g., in the case that the relay WTRU rejects paging monitoring. In examples, a remote WTRU may trigger relay reselection, e.g., if the relay WTRU is unable to monitor paging on behalf of the remote WTRU. The relay WTRU may inform the remote WTRU (e.g., explicitly) of this (e.g., using one-way or two way signaling described herein). In examples, the remote WTRU may determine the inability of the relay to monitor paging, e.g., by applying the rules for paging monitoring based on information provided by the relay WTRU. The remote WTRU may exclude a relay WTRU from the candidate relays during reselection, e.g., in response to relay reselection triggered due to the inability of the relay WTRU to monitor paging on its behalf.

A remote WTRU may monitor POs of the remote WTRU. A relay WTRU may monitor POs of a remote WTRU or monitor a reduced set of POs of the remote WTRU (e.g., as described herein). A relay/remote WTRU may send an indication to the remote/relay WTRU of a missed paging occasion. The relay/remote WTRU may indicate one or more missed paging occasions to the remote/relay WTRU. For example, a remote WTRU may send an indication to a relay WTRU, e.g., in the case that the remote WTRU misses one or more of POs of the remote WTRU on Uu, e.g., due to one or more of the following. One or more of the remote WTRU's POs on UU may be missed due to Uu link problems (e.g., a low RSRP). One or more the remote WTRU's POs on UU may be missed due to UL/SL prioritization. For example, the remote WTRU may prioritize a SL transmission/reception over reception on Uu during its PO and may send an indication to the relay WTRU as a result. One or more the remote WTRU's POs on Uu may be missed due to a future reserved resource on SL to transmit/receive. For example, the remote WTRU may be aware of a future transmission/reception which may be prioritized over reception of Uu paging and may send an indication to the relay WTRU, e.g., prior to the transmission/reception.

The relay WTRU may send to the network device or the remote WTRU a missed paging occasion indication. The missed paging occasion indication may indicate a paging occasion that was missed by the relay WTRU. The relay WTRU may send to the network device a missed paging occasion indication, and the missed paging occasion indication may indicate a paging occasion that was missed by the remote WTRU.

The remote WTRU/relay WTRU (e.g., in response to reception of the indication described herein from the peer WTRU) may initiate PO monitoring of a next PO or next X number of POs, where X may be configured (e.g., preconfigured). In examples, the relay WTRU may initiate PO monitoring of the next X number of POs of the remote WTRU on Uu. The remote/relay WTRU may continue monitoring POs on Uu until a next indication turning off the PO monitoring. The remote/relay WTRU may be allowed to send the indication, e.g., based on the factors described herein (e.g., priority of service).

A relay WTRU may send an indication to the network of a missed paging occasion (e.g., an indication that the relay WTRU missed a PO of the remote WTRU). A relay WTRU may send an indication/request to the network, e.g., in the case of one or more missed POs by the relay and/or remote WTRU. For example, in response to (e.g., following) reception of a missed PO indication from a remote WTRU, the relay WTRU may monitor a PO for the remote WTRU (e.g., if the indication comes prior to the PO), or may request the network for any missed paging messages (e.g., if the indication comes after the PO which was missed, or if the relay WTRU itself missed a PO of the remote WTRU). The relay WTRU (e.g., in response to such a request) may forward any paging message that may be received, e.g., if the network responds with a paging message.

In examples, a relay WTRU may send a request (e.g. via an RRC message in RRC_CONNECTED, or while staying in RRC_INACTIVE) to the network, which may indicate that the relay WTRU may not monitor paging for a (e.g., particular) remote WTRU, which may be for a period of time. The request may contain a WTRU ID, the time period or a number of upcoming POs, and/or a cause. The relay WTRU may send the request, e.g., if it is unable to monitor a PO on behalf of the remote WTRU, or skip monitoring one or more POs of a remote WTRU. The relay WTRU may prioritize SL transmission/reception. The relay WTRU may experience low battery power and/or overheating. The relay WTRU may prioritize another frequency and/or carrier. The relay WTRU may have a measurement gap (or a similar gap) configured by the network by which it may be measuring on a different frequency. The relay WTRU may expect to receive paging messages (e.g., any paging messages) intended to the remote WTRU (e.g., via RRC signaling by the network), e.g., based on the examples described herein.

A network may indicate the path (e.g., SL or Uu) to establish a connection.

A remote WTRU in multipath may determine a path for connection establishment (e.g., via Uu, or via a (e.g., a specific) relay) triggered by data arrival and/or paging, e.g., based on an indication from the network. The network may provide an explicit indication of the path to use, e.g., an indication of direct or indirect. The explicit indication may be provided by dedicated RRC signaling (e.g., in a release message). The explicit indication may be provided in a paging message. The explicit indication may be provided in system information, e.g., if it is addressed to multiple remote WTRUs in the cell. For example, a remote WTRU may receive a paging message, which may indicate to initiate connection establishment via the Uu path. If the remote WTRU satisfies some additional criteria, e.g., as disclosed herein (e.g., Uu RSRP being above a threshold) for initiating the connection establishment (e.g., via Uu), the remote WTRU may perform connection establishment (e.g., via Uu).

The remote WTRU in multipath may determine the path (e.g., determine the path implicitly) from the network indication. For example, the remote WTRU may determine the path for connection establishment (e.g., implicitly) using one or more of the following: timing of the paging message, which may be relative to a WTRU's SL DRX, relative to a WTRU's pending SL transmissions, and/or relative to an expected time in which the WTRU may monitor SL; or the path over which the paging message may be received.

A relay WTRU may refuse/reject (e.g., not implement) a request to monitor paging on behalf of a remote WTRU.

A relay WTRU may reject/refuse a request to monitor paging on behalf of a remote WTRU. A relay WTRU may determine such rejection/refusal, e.g., based on factors at the relay WTRU, which may be in combination with factors at the remote WTRU.

A relay WTRU may determine to refuse/reject a request, e.g., based on its own RRC state, its (e.g., current) Uu paging monitoring activity (e.g., at the time of the request), and/or the IC/OOC information and/or priority information from the remote WTRU. A relay WTRU may receive a request from the remote WTRU, which may include one or more of an IC/OOC indication or priority information, and the priority information may indicate a priority associated with the services for which the remote WTRU may be paged. The information may be configured at the remote WTRU by the network (e.g., as an explicit priority, or based on the bearer configuration information).

The relay WTRU may determine to accept/reject a request, e.g., based on the following criteria. If the relay WTRU is in RRC_CONNECTED, it may accept the request.

If the relay WTRU is in RRC_IDLE/RRC_INACTIVE, the relay WTRU may accept/reject as follows. The relay WTRU may accept the request if the remote WTRU indicates OOC and/or the priority provided to the relay WTRU from the remote WTRU is above a threshold. Otherwise, the relay WTRU may accept the request if the POs of the remote WTRU overlap with the (e.g., overlap with the current) paging monitoring occasions at the relay WTRU (e.g., its own POs, or other remote WTRU POs that are being monitored). Overlapping may include a full or partial overlap or the POs being spaced by less than a threshold compared to the current POs. The relay WTRU may (e.g., may otherwise) reject the request.

Figure 7:
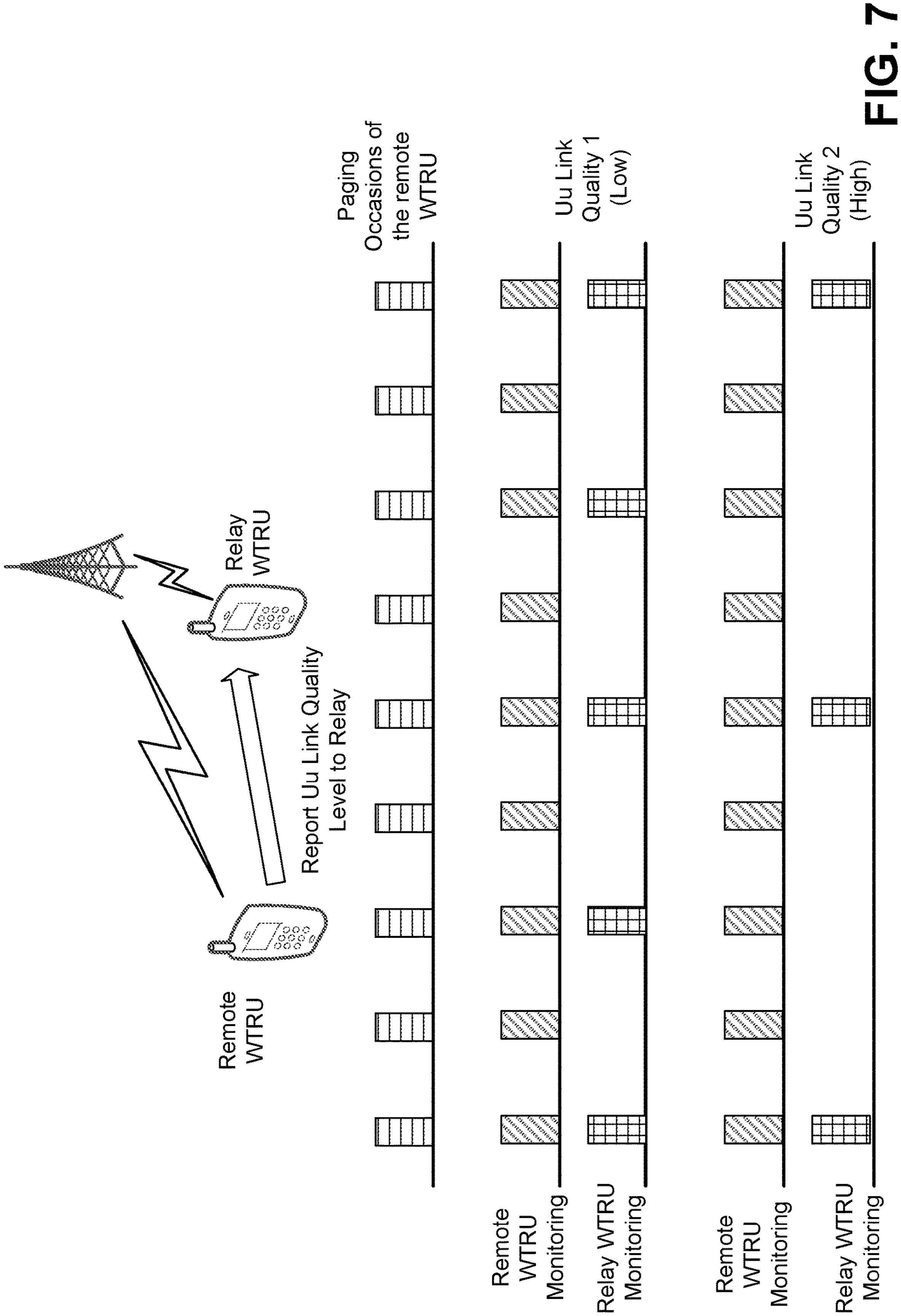
FIG. 7 illustrates an example of monitoring paging occasions.

A relay WTRU may monitor a subset (e.g., portion) of the remote WTRU POs, for example, based on Uu link quality at the remote WTRU (e.g., the relay WTRU may receive configuration information indicating a respective monitoring pattern (e.g., respective PO monitoring pattern) for the relay WTRU to use based on a respective value or threshold associated with a respective remote WTRU Uu link quality (e.g., a respective value of the link quality). A relay WTRU may determine whether to monitor for a paging message for a remote WTRU, and if the relay WTRU determines to monitor for a paging message for the remote WTRU, the relay WTRU may determine the specific paging occasions out of a set of paging occasions (e.g., the specific POs the relay WTRU monitors may be a subset of the POs of the remote WTRU, for example as shown in FIG. 7). The specific POs may be determined based on the Uu link quality indicated by the remote WTRU to the relay WTRU and/or the RRC state of the relay WTRU. In examples, as described herein, the relay WTRU may determine a specific monitoring pattern to use to monitor POs of the remote WTRU based on the Uu link quality from the remote WTRU to the network as indicated by the remote WTRU to the relay WTRU. In examples, as described herein, the relay WTRU may determine the monitoring pattern (e.g., a subset of the remote WTRU POs) to use to monitor POs of the remote WTRU if the relay WTRU is in a connected DRX operation, an idle operation (e.g., idle state), or an inactive operation (e.g., inactive operation).

In examples, the relay WTRU may receive, from the remote WTRU, an indication of the Uu link quality (e.g., a link quality level, value, etc.) between the remote WTRU and the network. The remote WTRU may send the indication in a message (e.g., in PC5-RRC message or other message). The indication may be used (e.g., by the remote WTRU and/or the relay WTRU) to enable/disable or configure the paging monitoring (e.g., on behalf of the remote WTRU) at the relay WTRU (e.g., as described herein). The indication may be a pre-defined or configured level, which may correspond to a range of Uu RSRP values measured by the remote WTRU, e.g., as described herein. The indication may correspond to the actual Uu RSRP measurement(s) (e.g., value(s) of Uu RSRP measurement(s)). The relay WTRU may receive a request (e.g., message) from the remote WTRU (e.g., in examples in the same message that includes the indication) to monitor the POs of the remote WTRU. The request may be included (e.g., implicitly included) in information in the message (e.g., if the Uu quality level is included in the message or if the Uu quality is above a minimum configured threshold, such information itself may indicate a request for the relay WTRU to monitor POs of the remote WTRU without a separate request). The relay WTRU (e.g., in response to reception of the message (e.g., along with the request)), may determine whether to monitor the PO(s) of the remote WTRU, and if the relay WTRU determines to monitor the PO(s) of the remote WTRU, the relay WTRU may determine which specific POs (e.g., as described herein, such as the POs of the remote WTRU or a portion or subset of the POs of the remote WTRU). The relay WTRU may use the information in the message (e.g., PC5-RRC message), for example, the information configuring the paging monitoring, to determine the set of paging occasions (POs) of the remote WTRU. If the relay WTRU is in RRC_CONNECTED and configured on a bandwidth part (BWP) with a common search space (CSS), the relay WTRU may decide to monitor (e.g., monitor all of) the POs of the remote WTRU. The relay WTRU (e.g., at a slot which corresponds to the PO of the remote WTRU) may decode PDCCH for the P-RNTI, and may search for the remote WTRU's WTRU ID in the paging record. The relay WTRU may forward the paging record to the remote WTRU, e.g., if it receives the paging message. If the relay WTRU is in RRC_CONNECTED and configured without a CSS, the relay WTRU may abstain from monitoring any POs. The relay WTRU may (e.g., in this case) inform the remote WTRU that it monitors (e.g., monitors all) POs (e.g., by virtue of receiving the paging from the network in dedicated signaling).

The relay WTRU may (e.g., if the relay WTRU is in RRC_IDLE, RRC_INACTIVE, or a connected DRX operation) determine whether to monitor paging occasion(s) of the remote WTRU, and if it determines to monitor paging occasion(s) of the remote WTRU, the relay WTRU may determine which paging occasion(s) to monitor, e.g., as follows and/or as described herein.

The percentage or ratio of the remote WTRU paging occasions monitored by the relay WTRU may be a function of the Uu link quality received from the remote WTRU (e.g., the relay WTRU may monitor PO(s) of the remote WTRU, where different monitoring patterns may be used based on different link qualities indicated by the remote WTRU). In examples, the relay WTRU may be configured with a factor to apply to the remote WTRU DRX cycle (e.g., resulting in a PO monitoring pattern), which may be, based on the reported remote WTRU to network Uu link quality, for example the relay WTRU may determine PO(s) of the remote WTRU to monitor, where different monitoring patterns may be indicated based on different link qualities indicated by the remote WTRU (e.g., different factors may be used for different link quality values/thresholds, which may result in different determined monitoring patterns). In the case of a given received Uu link quality associated with the remote WTRU, the relay WTRU may determine the DRX cycle (e.g., the effective DRX cycle) of its own monitoring of the remote WTRU paging occasions, e.g., by multiplying the actual DRX cycle of the remote WTRU by the factor (e.g., a factor of 2 may indicate that the relay WTRU may monitor for paging on behalf of the remote WTRU every 2 remote WTRU paging occasions, for example as shown in FIG. 7). In examples, the relay WTRU may receive configuration information indicating a respective factor to apply based on a respective quality level or threshold (e.g., different factors may be used for different link quality values/thresholds, which may result in different determined monitoring patterns). The factor may be used by the relay WTRU to determine a ratio of radio frames (e.g., system frame number (SFN) numbers), where the relay WTRU may monitor paging within those radio frames. If a specific Uu quality level is configured with a factor of 4, the relay WTRU may monitor (e.g., may monitor all) remote WTRU paging occasions in one of every 4 radio frames.

The relay WTRU may use other factor(s) to determine the specific POs. For example, the relay WTRU may determine the offset of the DRX pattern (e.g., effective DRX pattern), for example, the DRX pattern determined after a DRX cycle (e.g., effective DRX cycle) is obtained by multiplying the actual remote WTRU DRX cycle by the Uu quality dependent factor), e.g., based on the offset that ensures the overlap (e.g., best overlap) of the remote WTRU POs to be monitored by the relay WTRU and the on time of the relay WTRU (e.g., taking into account its own DRX configuration, and/or extra POs which are monitored on behalf of other remote WTRUs). The offset may be paging occasions (e.g., specific paging occasions) in a DRX pattern (e.g., monitoring half of the POs, such as the first, third, and fifth POs, etc.)

If the Uu quality level provided by the remote WTRU is above a threshold, the relay WTRU may decide to not monitor paging on behalf of the remote WTRU. For example, the link quality between the remote WTRU and the network may be above a threshold that indicates little benefit of additional monitoring.

If the Uu quality level provided by the remote WTRU is below a threshold, the relay WTRU may decide to monitor (e.g., monitor all) paging occasions of the remote WTRU. For example, the link quality between the remote WTRU and the network may be below a threshold that indicates that the remote WTRU is unlikely to receive paging messages.

The relay WTRU (e.g., in response to a determination to monitor POs of a remote WTRU, for example as described herein) may send the results of the determination in the form of one or more of the following: an indication of whether or not the relay WTRU monitors the PO(s) of the remote WTRU; or, information indicating the specific PO(s) monitored, e.g., by sending the associated parameters (e.g., effective offset or effective DRX cycle), or by sending the actual monitoring pattern.

The results of the determination may be sent as a response to the WTRU initiated message (e.g., PC5-RRC message), for example, providing the enable/disable (e.g., in a two-way signaling exchange). In examples, the relay WTRU may send a response (e.g., send a response only) to indicate that it decides to monitor/not monitor paging occasions (e.g., to monitor at least some paging occasions). In examples, the actual paging occasions (monitoring pattern) may be sent.

The relay WTRU (e.g., in response to a change in condition(s) described herein (e.g. the RRC state of the relay WTRU changes) may send an updated result (e.g., in a one-way signaling exchange).

In examples, the relay WTRU (e.g., a first WTRU) may receive, from a network device (e.g., a base station, such as a gNB, etc.), configuration information that indicates information associated with a first monitoring pattern to use if a first condition is satisfied and information associated with a second monitoring pattern to use if a second condition is satisfied. The first condition and the second condition may be associated with a link quality (e.g., a Uu link quality) associated with a remote WTRU (e.g., a second WTRU). The link quality may be associated with a link between the remote WTRU and the network device.

The relay WTRU may receive a first indication from the second WTRU, and the first indication may indicate a first value of the link quality (e.g., an RSRP associated with the Uu link quality). The relay WTRU may determine, based on the first value of the link quality, that the first condition is satisfied. The relay WTRU may send, based on the first condition being satisfied, an indication of the first monitoring pattern (e.g., to the second WTRU). The relay WTRU may monitor, based on the first condition being satisfied, a first paging occasion in accordance with the first monitoring pattern. The relay WTRU may receive (e.g., from the network device) a first paging message for the remote WTRU in the first paging occasion. The relay WTRU may send information indicating the received first paging message to the second WTRU.

In examples, the relay WTRU may receive a second indication from the remote WTRU. The second indication may indicate a second value of the link quality. The relay WTRU may determine, based on the second value of the link quality, that the second condition is satisfied. The relay WTRU may send, based on the second condition being satisfied, an indication of the second monitoring pattern (e.g., to the second WTRU). The relay WTRU may, based at least on the second condition being satisfied, monitor a second paging occasion in accordance with the second monitoring pattern. The relay WTRU may receive (e.g., from a base station such as a gNB) a second paging message for the remote WTRU in the second paging occasion. The relay WTRU may send an indication of the received second paging message to the remote WTRU.

The first monitoring pattern may be a first paging occasion pattern, and the first monitoring pattern may be determined based on a reduced discontinuous reception (DRX) cycle of the remote WTRU. Being configured to monitor the first paging occasion in accordance with the first monitoring pattern may be based on the first WTRU being associated with a power saving operation. The power saving operation may be a connected DRX operation. The power saving operation may correspond to idle operation or inactive operation.

The relay WTRU may determine the first monitoring pattern using the information associated with the first monitoring pattern. The information associated with the first monitoring pattern may be a DRX cycle reduction that is used if the first condition is satisfied, and the DRX cycle reduction may be a reduction of a DRX cycle of the remote WTRU.

The relay WTRU may determine the first monitoring pattern, which may include one or more of the following. The first WTRU may receive identification information associated with the remote WTRU and a DRX cycle of the remote WTRU. The first WTRU may compute a paging occasion pattern based on the identification information and the DRX cycle. The first WTRU may determine a subset of paging occasions in the paging occasion pattern to monitor based on the first value of the link quality. The subset of paging occasions may correspond to the first monitoring pattern.

At the remote WTRU, the remote WTRU may determine whether to monitor Uu paging and/or receive paging from the relay WTRU, e.g., based on the indication from the relay WTRU. The remote WTRU may use the Uu link quality to make the determination.

The remote WTRU may receive (e.g., from the network) a mapping of Uu quality to quality level to be sent in the paging monitoring enable/disable and/or configuration message, which may be sent to the relay WTRU. The remote WTRU may send the actual Uu quality value in the message. The remote WTRU may send an IC/OOC indication to the relay WTRU (e.g., in addition to the Uu quality level), e.g., to inform the relay whether the remote WTRU is in coverage or out of coverage. The remote WTRU may send multipath capability to the relay WTRU, e.g., in a message (e.g., a previous message).

In examples, the remote WTRU may measure the Uu quality. If the Uu quality is below a threshold and the remote WTRU is in coverage (e.g., still in coverage even though the Uu quality is below the threshold), the remote WTRU may receive paging from Uu and SL. The remote WTRU may be configured with a set of SL slots (e.g., which may be related to the POs) for which the remote WTRU is indicated (e.g., required) to monitor SL. If the Uu quality is above a threshold, the remote WTRU may determine whether it monitors Uu (e.g., only monitors Uu) or SL (e.g., only SL), e.g., based on whether the relay WTRU has indicated that it will monitor (e.g., monitor all of) the POs of the remote WTRU. The remote WTRU may monitor Uu (e.g., only monitor Uu) if the relay WTRU has indicated it will monitor POs (e.g., monitor all POs) of the remote WTRU, and vice versa.

In examples, the remote WTRU may determine the POs monitored by the relay WTRU on behalf of the remote WTRU (e.g., if the remote WTRU is in coverage (e.g., and with Uu RSRP being above a threshold). The remote WTRU may monitor (e.g., monitor on Uu) POs (e.g., all POs) which are not monitored by the relay WTRU. If the Uu RSRP is below a threshold, the remote WTRU may monitor the POs on Uu (e.g., all the POs on Uu, as well as the indicated POs on SL. In examples described herein, monitoring a PO on SL may include monitoring a SL slots whose timing is related to the timing of the Uu PO (e.g., extended in time, delayed by an amount of time, etc.). If the remote WTRU receives an indication from the relay that the relay will not monitor POs (e.g., will not monitor any POs of the remote WTRU), the remote WTRU may trigger a relay reselection, e.g., if the Uu RSRP is below a threshold.

In examples, the remote WTRU may monitor the POs (e.g., all of the POs) on Uu, e.g., if the Uu RSRP is below a threshold and the relay WTRU indicates it will monitor a subset (e.g., a non-zero subset) of the POs. If the relay WTRU indicates it will monitor POs (e.g., all of the POs), the remote WTRU may not monitor POs (e.g., any POs) on Uu, e.g., regardless of the Uu RSRP. If the Uu RSRP is above a threshold, the remote WTRU may monitor the POs (e.g., only the POs) on Uu which are not (e.g., which are not already) monitored by the relay WTRU.

FIG. 7 illustrates an example of a relay WTRU monitoring different paging occasions of associated with a remote WTRU based on different link qualities indicated by the remote WTRU (e.g., as described herein). The remote WTRU may send a link quality level/value (e.g., Uu link quality level/value used as an example herein) to the relay WTRU. The relay WTRU (e.g., if in RRC_IDLE or RRC_INACTIVE) may, e.g., as described herein, determine a pattern of remote WTRU POs that it will monitor, e.g., based on the received Uu quality level. For example, a configuration (e.g., first monitoring pattern) is shown in FIG. 7, where the relay WTRU monitors a larger percentage of the paging occasions of the remote WTRU if the remote Uu quality is lower (e.g., lower than a threshold), and, the relay WTRU uses another configuration (e.g., second monitoring pattern) where the relay WTRU monitors fewer paging occasions if the received Uu quality is higher (e.g., higher than a threshold).

Although features and elements described above are described in particular combinations, each feature or element may be used alone without the other features and elements of the preferred embodiments, or in various combinations with or without other features and elements.

Although the implementations described herein may consider 3GPP specific protocols, it is understood that the implementations described herein are not restricted to this scenario and may be applicable to other wireless systems. For example, although the solutions described herein consider LTE, LTE-A, New Radio (NR) or 5G specific protocols, it is understood that the solutions described herein are not restricted to this scenario and are applicable to other wireless systems as well. For example, while the system has been described with reference to a 3GPP, 5G, and/or NR network layer, the envisioned embodiments extend beyond implementations using a particular network layer technology. Likewise, the potential implementations extend to all types of service layer architectures, systems, and embodiments. The techniques described herein may be applied independently and/or used in combination with other resource configuration techniques.

The processes described herein may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read-only memory (ROM), a random access memory (RAM), a register, cache memory, semiconductor memory devices, magnetic media such as, but not limited to, internal hard disks and removable disks, magneto-optical media, and/or optical media such as compact disc (CD)-ROM disks, and/or digital versatile disks (DVDs). A processor in association with software may be used to implement a radio frequency transceiver for use in a WTRU, terminal, base station, RNC, and/or any host computer.

It is understood that the entities performing the processes described herein may be logical entities that may be implemented in the form of software (e.g., computer-executable instructions) stored in a memory of, and executing on a processor of, a mobile device, network node or computer system. That is, the processes may be implemented in the form of software (e.g., computer-executable instructions) stored in a memory of a mobile device and/or network node, such as the node or computer system, which computer-executable instructions, when executed by a processor of the node, perform the processes discussed. It is also understood that any transmitting and receiving processes illustrated in figures may be performed by communication circuitry of the node under control of the processor of the node and the computer-executable instructions (e.g., software) that it executes.

The various techniques described herein may be implemented in connection with hardware or software or, where appropriate, with a combination of both. Thus, the implementations and apparatus of the subject matter described herein, or certain aspects or portions thereof, may take the form of program code (e.g., instructions) embodied in tangible media including any other machine-readable storage medium wherein, when the program code is loaded into and executed by a machine, such as a computer, the machine becomes an apparatus for practicing the subject matter described herein. In the case where program code is stored on media, it may be the case that the program code in question is stored on one or more media that collectively perform the actions in question, which is to say that the one or more media taken together contain code to perform the actions, but that—in the case where there is more than one single medium—there is no requirement that any particular part of the code be stored on any particular medium. In the case of program code execution on programmable devices, the computing device generally includes a processor, a storage medium readable by the processor (including volatile and non-volatile memory and/or storage elements), at least one input device, and at least one output device. One or more programs that may implement or utilize the processes described in connection with the subject matter described herein, e.g., through the use of an API, reusable controls, or the like. Such programs are preferably implemented in a high level procedural or object-oriented programming language to communicate with a computer system. However, the program(s) can be implemented in assembly or machine language, if desired. In any case, the language may be a compiled or interpreted language and combined with hardware implementations.

Although example embodiments may refer to utilizing aspects of the subject matter described herein in the context of one or more stand-alone computing systems, the subject matter described herein is not so limited, but rather may be implemented in connection with any computing environment, such as a network or distributed computing environment. Still further, aspects of the subject matter described herein may be implemented in or across a plurality of processing chips or devices, and storage may similarly be affected across a plurality of devices. Such devices might include personal computers, network servers, handheld devices, supercomputers, or computers integrated into other systems such as automobiles and airplanes.

In describing the preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

What is claimed:

1. A first wireless transmit-receive unit (WTRU), the first WTRU comprising:

a processor that is configured to:

receive configuration information that indicates information associated with a first monitoring pattern to use if a first condition is satisfied and information associated with a second monitoring pattern to use if a second condition is satisfied, wherein the first condition and the second condition are associated with a link quality associated with a second WTRU;

receive, from the second WTRU, a first indication, wherein the first indication indicates a first value of the link quality;

determine, based on the first value of the link quality, that the first condition is satisfied;

send, based on the first condition being satisfied, an indication of the first monitoring pattern;

monitor, based at least on the first condition being satisfied, a first paging occasion in accordance with the first monitoring pattern;

receive a first paging message for the second WTRU in the first paging occasion; and send information indicating the received first paging message to the second WTRU.

2. The first WTRU of claim 1, wherein the processor is further configured to:

receive, from the second WTRU, a second indication, wherein the second indication indicates a second value of the link quality;

determine, based on the second value of the link quality, that the second condition is satisfied;

send, based on the second condition being satisfied, an indication of the second monitoring pattern;

monitor, based at least on the second condition being satisfied, a second paging occasion in accordance with the second monitoring pattern;

receive a second paging message for the second WTRU in the second paging occasion; and send an indication of the received second paging message to the second WTRU.

3. The first WTRU of claim 1, wherein the first monitoring pattern is a first paging occasion pattern, and wherein the first monitoring pattern is determined based on a reduced discontinuous reception (DRX) cycle of the second WTRU.

4. The first WTRU of claim 1, wherein being configured to monitor the first paging occasion in accordance with the first monitoring pattern is further based on the first WTRU being associated with a power saving operation.

5. The first WTRU of claim 1, wherein the processor is further configured to determine the first monitoring pattern using the information associated with the first monitoring pattern, wherein the information associated with the first monitoring pattern is a DRX cycle reduction that is used if the first condition is satisfied, and wherein the DRX cycle reduction is a reduction of a DRX cycle of the second WTRU.

6. The first WTRU of claim 1, wherein the processor is further configured to determine the first monitoring pattern, wherein being configured to determine the first monitoring pattern comprises being configured to:

receive identification information associated with the second WTRU and a DRX cycle of the second WTRU;

compute a paging occasion pattern based on the identification information and the DRX cycle of the second WTRU; and determine a subset of paging occasions in the paging occasion pattern to monitor based on the first value of the link quality, wherein the subset of paging occasions corresponds to the first monitoring pattern.

7. The first WTRU of claim 1, wherein the first WTRU is a relay WTRU and the second WTRU is a remote WTRU, and wherein the link quality is associated with a link between the second WTRU and a network device.

8. The first WTRU of claim 1, wherein the processor is further configured to:

send, to one or more of a network device or the second WTRU, a missed paging occasion indication, wherein the missed paging occasion indication indicates a paging occasion that was missed by the first WTRU; or send to the network device a missed paging occasion indication, wherein the missed paging occasion indication indicates a paging occasion that was missed by the second WTRU.

9. A method for a first wireless transmit-receive unit (WTRU), the method comprising:

receiving configuration information that indicates information associated with a first monitoring pattern to use if a first condition is satisfied and information associated with a second monitoring pattern to use if a second condition is satisfied, wherein the first condition and the second condition are associated with a link quality associated with a second WTRU;

receiving, from the second WTRU, a first indication, wherein the first indication indicates a first value of the link quality;

determining, based on the first value of the link quality, that the first condition is satisfied;

sending, based on the first condition being satisfied, an indication of the first monitoring pattern;

monitoring, based at least on the first condition being satisfied, a first paging occasion in accordance with the first monitoring pattern;

receiving a first paging message for the second WTRU in the first paging occasion; and sending information indicating the received first paging message to the second WTRU.

10. The method of claim 9, the method further comprising:

receiving, from the second WTRU, a second indication, wherein the second indication indicates a second value of the link quality;

determining, based on the second value of the link quality, that the second condition is satisfied;

sending, based on the second condition being satisfied, an indication of the second monitoring pattern;

monitoring, based at least on the second condition being satisfied, a second paging occasion in accordance with the second monitoring pattern;

receiving a second paging message for the second WTRU in the second paging occasion; and sending an indication of the received second paging message to the second WTRU.

11. The method of claim 9, wherein the first monitoring pattern is a first paging occasion pattern, and wherein the first monitoring pattern is determined based on a reduced discontinuous reception (DRX) cycle of the second WTRU.

12. The method of claim 9, wherein monitoring the first paging occasion in accordance with the first monitoring pattern is further based on the first WTRU being associated with a power saving operation.

13. The method of claim 9, wherein the method further comprises determining the first monitoring pattern using the information associated with the first monitoring pattern, and wherein the information associated with the first monitoring pattern is a DRX cycle reduction that is used if the first condition is satisfied, and wherein the DRX cycle reduction is a reduction of a DRX cycle of the second WTRU.

14. The method of claim 9, wherein the method further comprises determining the first monitoring pattern, wherein determining the first monitoring pattern comprises:

receiving identification information associated with the second WTRU and a DRX cycle of the second WTRU;

computing a paging occasion pattern based on the identification information and the DRX cycle; and determining a subset of paging occasions in the paging occasion pattern to monitor based on the first value of the link quality, wherein the subset of paging occasions corresponds to the first monitoring pattern.

15. The method of claim 9, wherein the first WTRU is a relay WTRU and the second WTRU is a remote WTRU, and wherein the link quality is associated with a link between the second WTRU and a network device.

* * * * *